US 8,659,658 B2

Feb. 25, 2014

(12) United States Patent
Vassigh et al.

(54) PHYSICAL INTERACTION ZONE FOR GESTURE-BASED USER INTERFACES

(75) Inventors: Ali M. Vassigh, Redmond, WA (US); Christian Klein, Duvall, WA (US); Ernest L. Pennington, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 537 days.

(21) Appl. No.: 12/703,143

(22) Filed: Feb. 9, 2010

(65) Prior Publication Data

US 2011/0193939 A1  Aug. 11, 2011

(51) Int. Cl.
*H04N 7/18* (2006.01)

(52) U.S. Cl.
USPC .......................................... 348/143

(58) Field of Classification Search
USPC .................. 348/120–170; 345/473–485; 706/250–169
See application file for complete search history.

(56) References Cited

U.S. PATENT DOCUMENTS

| | | | |
|---|---|---|---|
| 4,627,620 A | 12/1986 | Yang | |
| 4,630,910 A | 12/1986 | Ross et al. | |
| 4,645,458 A | 2/1987 | Williams | |
| 4,695,953 A | 9/1987 | Blair et al. | |
| 4,702,475 A | 10/1987 | Elstein et al. | |
| 4,711,543 A | 12/1987 | Blair et al. | |
| 4,751,642 A | 6/1988 | Silva et al. | |
| 4,796,997 A | 1/1989 | Svetkoff et al. | |
| 4,809,065 A | 2/1989 | Harris et al. | |
| 4,817,950 A | 4/1989 | Goo | |
| 4,843,568 A | 6/1989 | Krueger et al. | |
| 4,893,183 A | 1/1990 | Nayar | |

(Continued)

FOREIGN PATENT DOCUMENTS

| | | |
|---|---|---|
| CN | 101254344 B | 6/2010 |
| EP | 0583061 A2 | 2/1994 |

(Continued)

OTHER PUBLICATIONS

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

(Continued)

*Primary Examiner* — Joseph Avellino
*Assistant Examiner* — Mark O Afolabi
(74) *Attorney, Agent, or Firm* — Judy Yee; Peter Taylor; Micky Minhas

(57) ABSTRACT

In a motion capture system having a depth camera, a physical interaction zone of a user is defined based on a size of the user and other factors. The zone is a volume in which the user performs hand gestures to provide inputs to an application. The shape and location of the zone can be customized for the user. The zone is anchored to the user so that the gestures can be performed from any location in the field of view. Also, the zone is kept between the user and the depth camera even as the user rotates his or her body so that the user is not facing the camera. A display provides feedback based on a mapping from a coordinate system of the zone to a coordinate system of the display. The user can move a cursor on the display or control an avatar.

20 Claims, 22 Drawing Sheets

(56) References Cited

U.S. PATENT DOCUMENTS

| | | |
|---|---|---|
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,674,877 B1 | 1/2004 | Jojic et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,340,077 B2 | 3/2008 | Gokturk et al. |
| 7,348,963 B2 | 3/2008 | Bell |
| 7,359,121 B2 | 4/2008 | French et al. |
| 7,367,887 B2 | 5/2008 | Watabe et al. |
| 7,372,977 B2 | 5/2008 | Fujimura et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |
| 7,746,345 B2 | 6/2010 | Hunter |

(56) References Cited

U.S. PATENT DOCUMENTS

| | | | |
|---|---|---|---|
| 7,760,182 | B2 | 7/2010 | Ahmad et al. |
| 7,809,167 | B2 | 10/2010 | Bell |
| 7,834,846 | B1 | 11/2010 | Bell |
| 7,835,732 | B2* | 11/2010 | Simons ............... 455/422.1 |
| 7,852,262 | B2 | 12/2010 | Namineni et al. |
| RE42,256 | E | 3/2011 | Edwards |
| 7,898,522 | B2 | 3/2011 | Hildreth et al. |
| 8,035,612 | B2 | 10/2011 | Bell et al. |
| 8,035,614 | B2 | 10/2011 | Bell et al. |
| 8,035,624 | B2 | 10/2011 | Bell et al. |
| 8,072,470 | B2 | 12/2011 | Marks |
| 2004/0017313 | A1* | 1/2004 | Menache ............... 342/465 |
| 2004/0155962 | A1* | 8/2004 | Marks ................... 348/169 |
| 2005/0059488 | A1* | 3/2005 | Larsen et al. ............. 463/36 |
| 2006/0152512 | A1* | 7/2006 | Gordon ................. 345/475 |
| 2008/0026838 | A1 | 1/2008 | Dunstan et al. |
| 2008/0152191 | A1 | 6/2008 | Fujimura et al. |
| 2008/0170123 | A1 | 7/2008 | Albertson et al. |
| 2009/0100383 | A1 | 4/2009 | Sunday et al. |
| 2009/0141933 | A1 | 6/2009 | Wagg |
| 2009/0221368 | A1 | 9/2009 | Yen et al. |
| 2009/0256801 | A1* | 10/2009 | Helmer .................. 345/156 |

FOREIGN PATENT DOCUMENTS

| | | | |
|---|---|---|---|
| JP | 08044490 | A1 | 2/1996 |
| WO | 93/10708 | A1 | 6/1993 |
| WO | 97/17598 | A1 | 5/1997 |
| WO | 99/44698 | A1 | 9/1999 |
| WO | WO2009059065 | | 5/2009 |

OTHER PUBLICATIONS

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Non-rigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

HE, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collision of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp.2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

English Machine-translation of Japanese Publication No. JP08-044490 published on Feb. 16, 1996.

Shivappa, et al., "Person Tracking With Audio-visual Cues Using the Iterative Decoding Framework," IEEE 5th International Conference on Advanced Video and Signal Based Surveillance, 2008, pp. 260-267.

Toyama, et al., "Probabilistic Tracking in a Metric Space," Eighth International Conference on Computer Vision, Vancouver, Canada, vol. 2, Jul. 2001, 8 pages.

Payne, "Gameplay Issues in the Design of Spatial 3D Gestures for Video Games", CHI 2006, Work-in-Progress, Apr. 22-27, 2006, pp. 1217-1222, Montreal, Quebec, Canada, ACM.

Cho, "Body-based Interfaces", Proceedings of the Fourth IEEE International Conference on Multimodal Interfaces, IEEE, Oct. 14-16, 2002, 7 pages.

Johnson, "In-Air Gestures Recognized by Smarter Touch Screens", Smarter Technology, Dec. 18, 2009, 2 pages, http://www.smartertechnology.com/c/a/Technology-For-Change/InAir-Gestures-Recognized-by-Smarter-Touch-Screens/.

Vance, "Now, Electronics That Obey Hand Gestures", NYTimes.com, Personal Tech, Jan. 11, 2010, http://www.nytimes.com/2010/01/12/technology/personaltech/12gesture.html?hp.

Jung, "Real-Time Robust Body Part Tracking for Augmented Reality Interface", Virtual Reality Continuum and Its Applications, Proceedings of the 8th International Conference on Virtual Reality Continuum and its Applications in Industry, Dec. 14-15, 2009, pp. 203-207, ACM, New York, NY, USA.

Conci, "Natural Human-Machine Interface Using an Interactive Virtual Blackboard", DIT—University of Trento (Italy), IEEE, Sep. 16-Oct. 19, 2007, pp. 181-184.

Ringel, "Barehands: Implement-Free Interaction with a Wall-Mounted Display", Conference on Human Factors in Computing Systems, CHI '01 extended abstracts on Human factors in computing systems, Mar. 31-Apr. 5, 2001, pp. 367-368, ACM, New York, NY, USA.

(56) References Cited

OTHER PUBLICATIONS

Free Flow, 3D Computer Interface, Vimeo, Apr. 27, 2009, http://vimeo.com/4366452.
Response to Office Action dated Aug. 9, 2013, Chinese Patent Application No. 201110040556.X.
English translation of the Summary of Response to Office Action and Amended Claims dated Aug. 9, 2013, Chinese Patent Application No. 201110040556.X.
Chinese Office Action dated Apr. 3, 2013, Chinese Patent Application No. 201110040556.X.

* cited by examiner

Fig. 2a
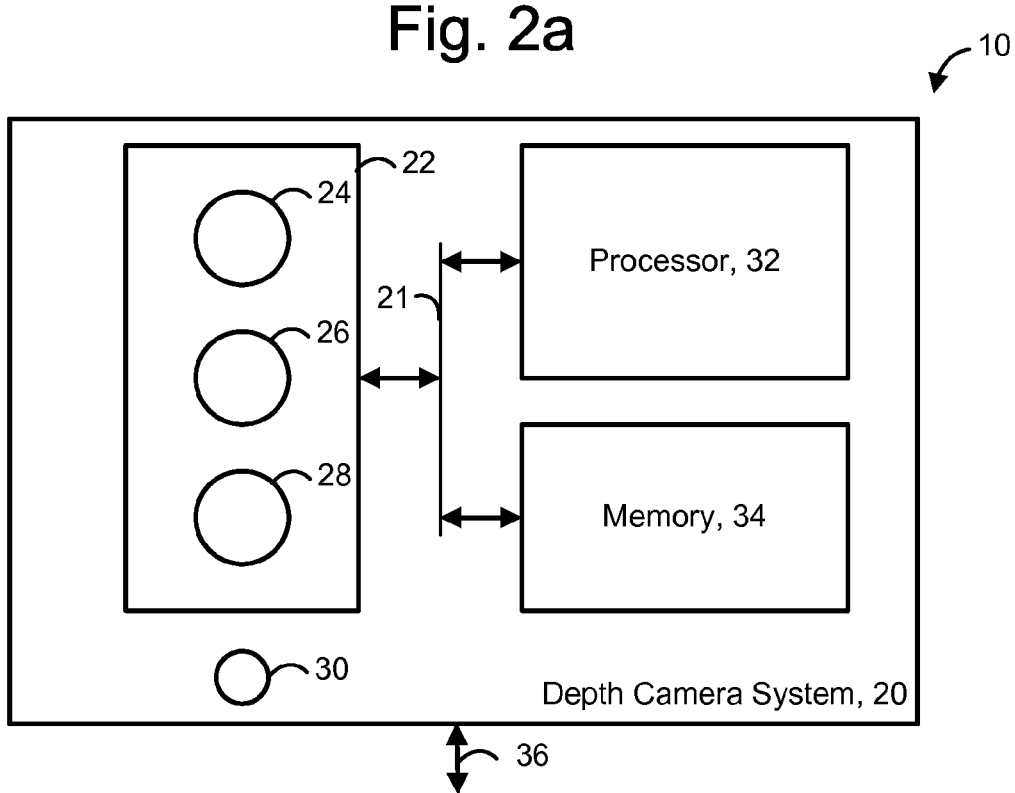
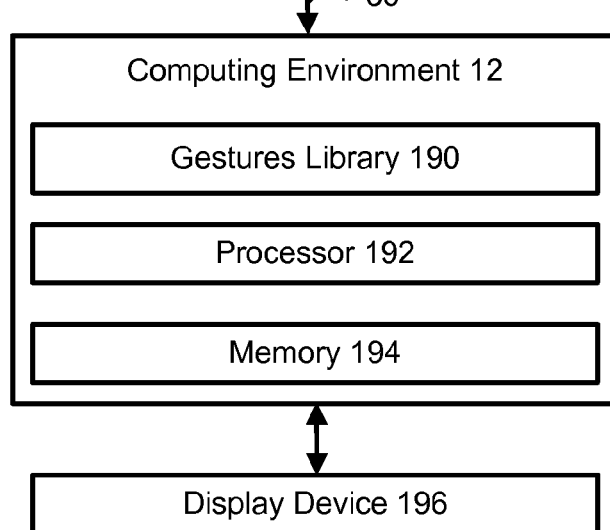
Fig. 2b
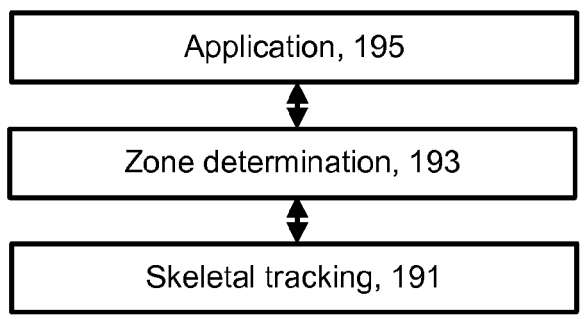

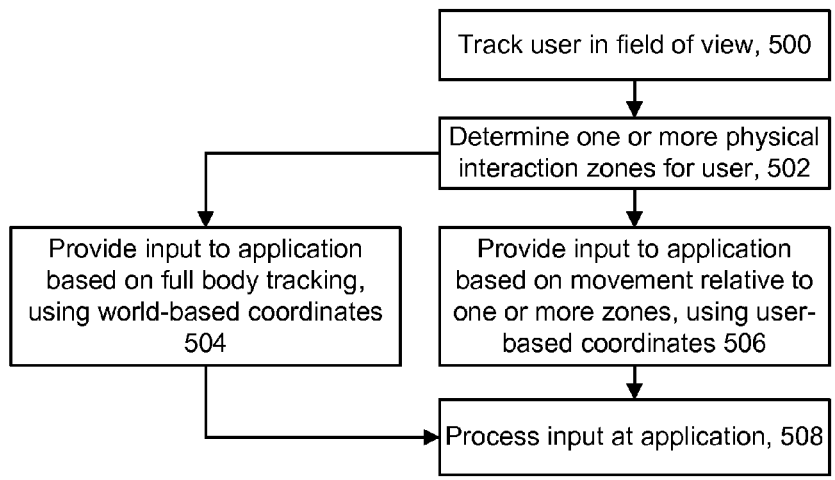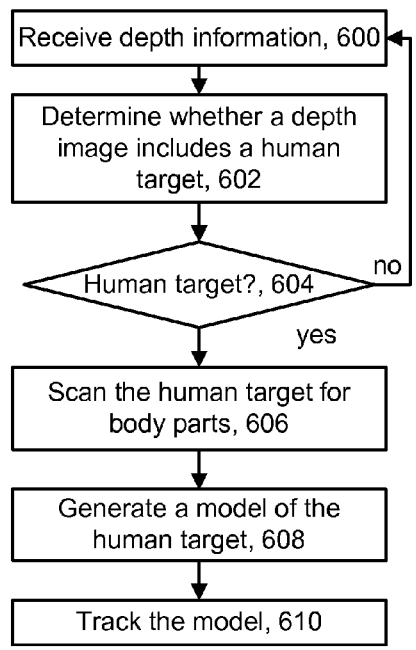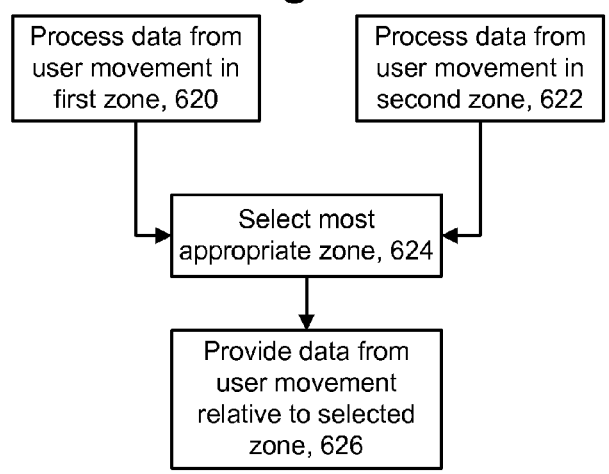

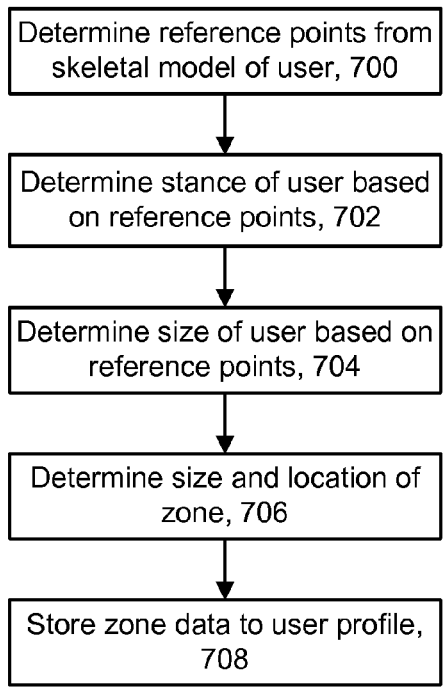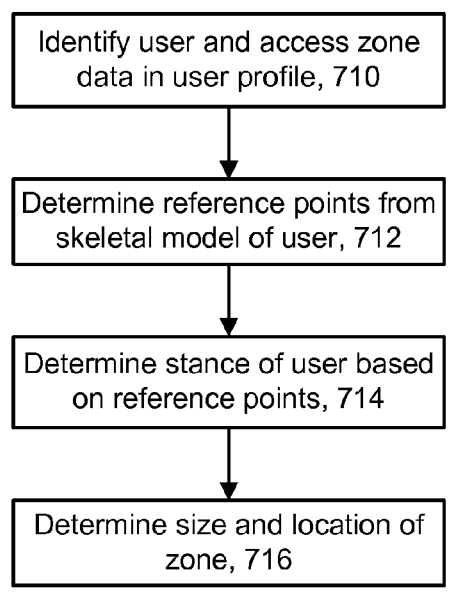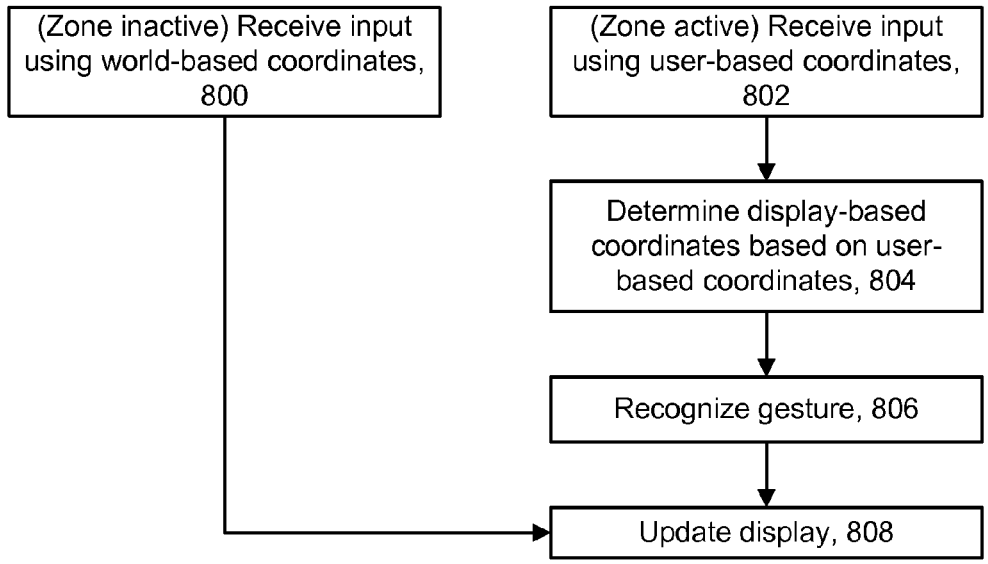

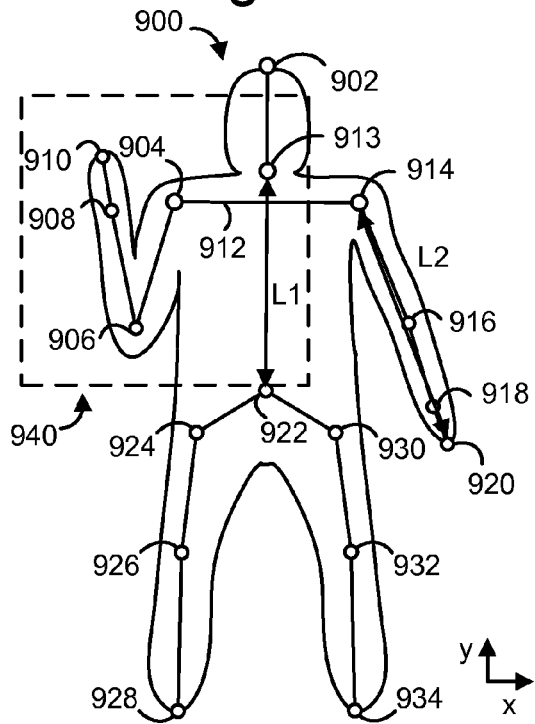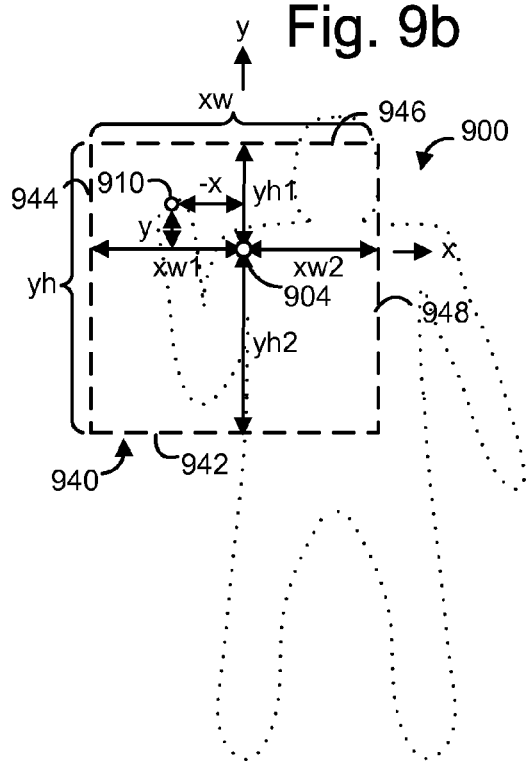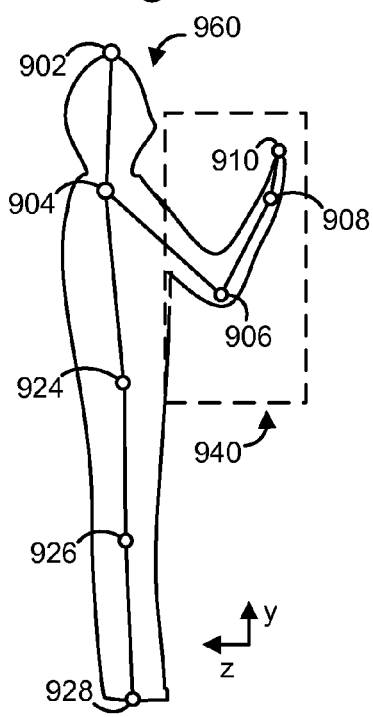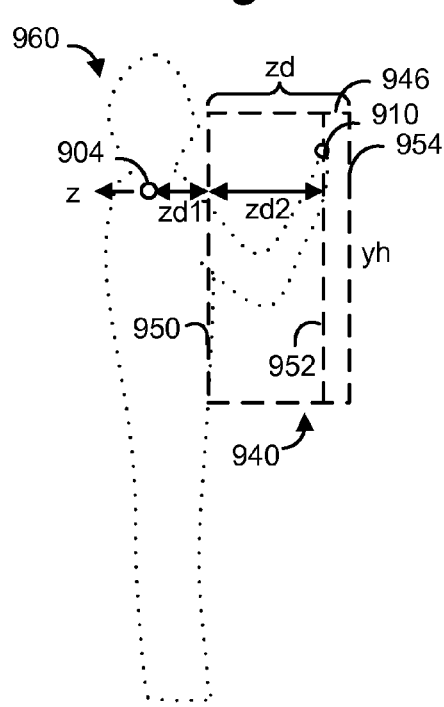

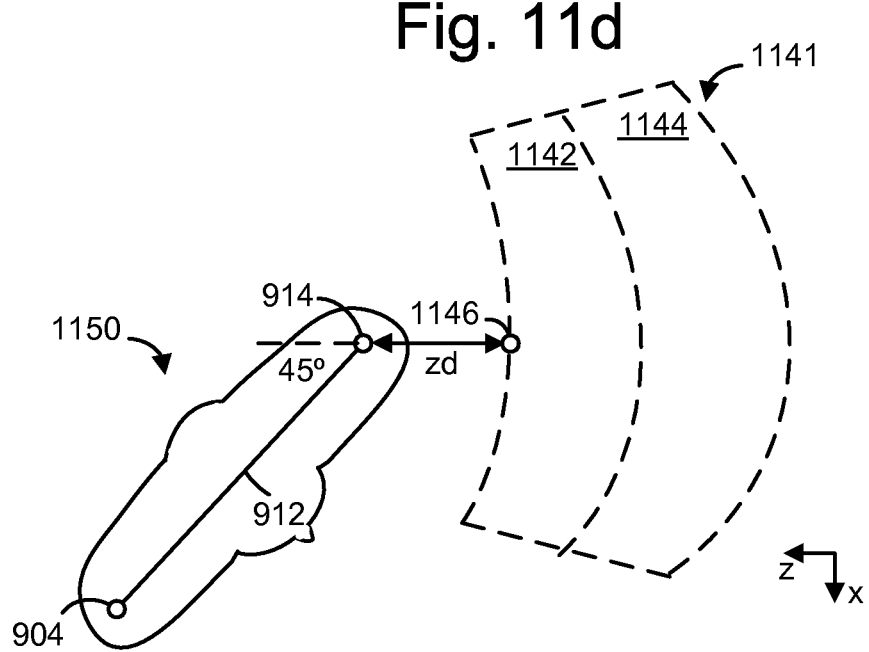
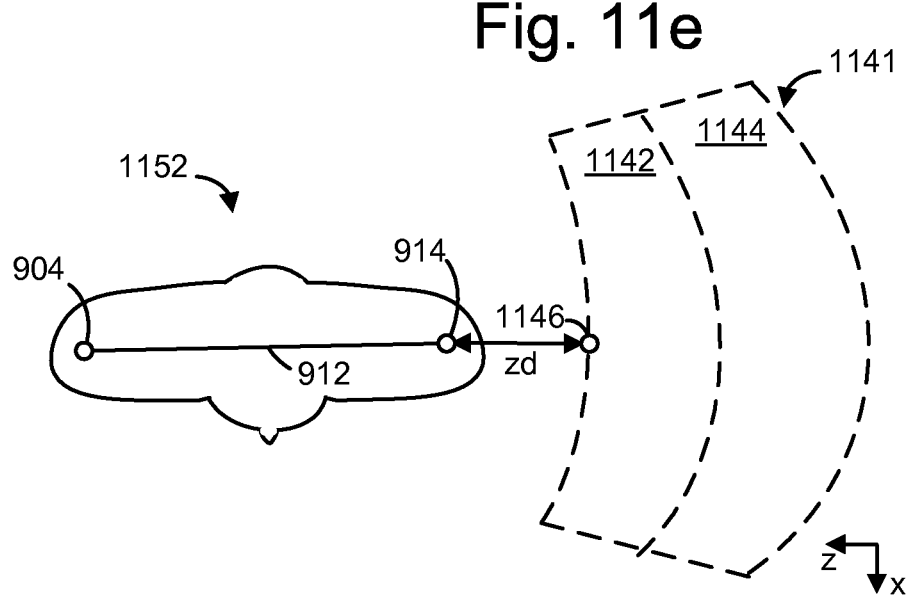

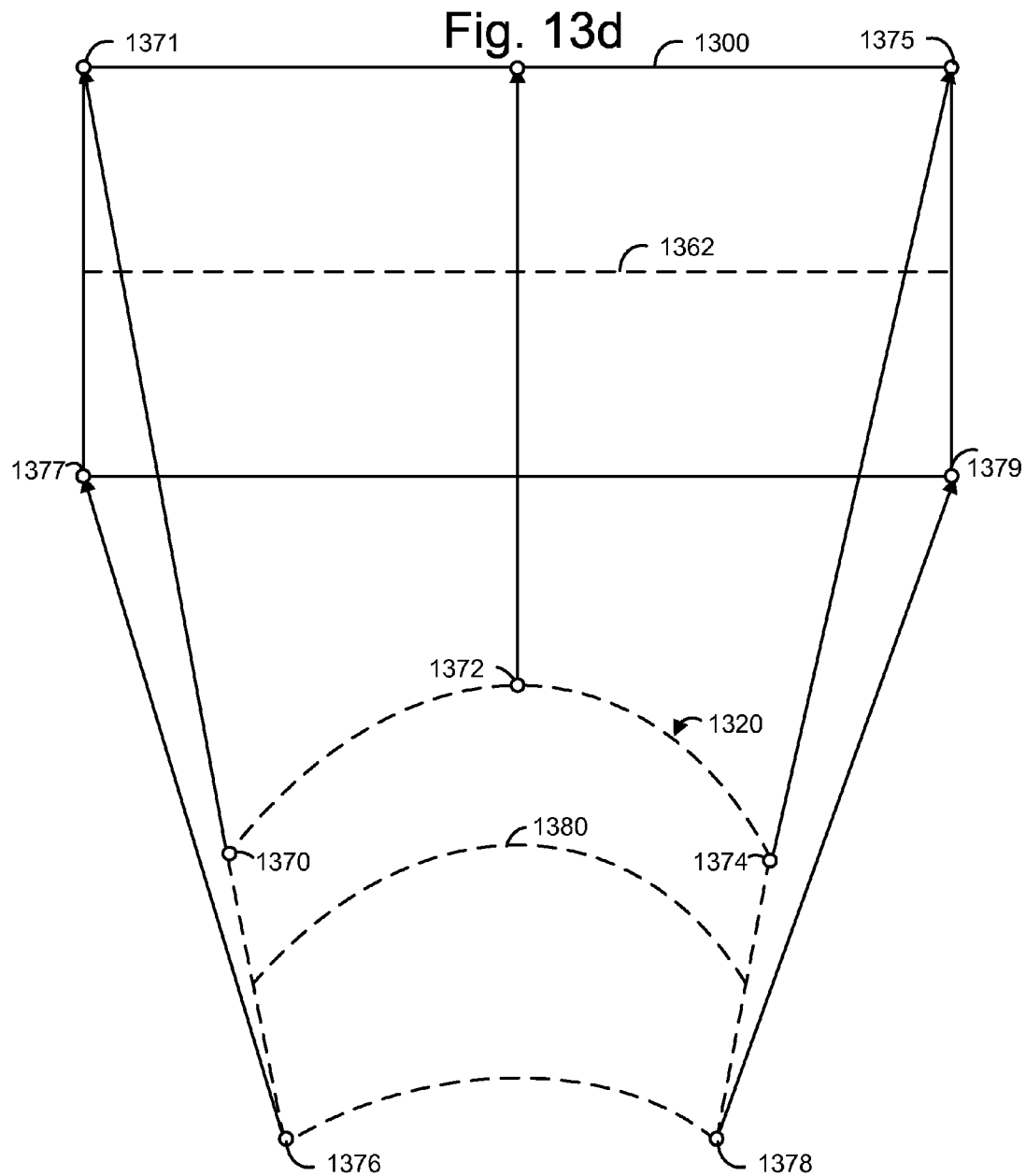

PHYSICAL INTERACTION ZONE FOR GESTURE-BASED USER INTERFACES

BACKGROUND

Motion capture systems obtain data regarding the location and movement of a human or other subject in a physical space, and can use the data as an input to an application in a computing system. Many applications are possible, such as for military, entertainment, sports and medical purposes. For instance, the motion of humans can be mapped to a three-dimensional (3-D) human skeletal model and used to create an animated character or avatar. Optical systems, including those using visible and invisible, e.g., infrared, light, use cameras to detect the presence of a human in a field of view. However, further refinements are needed which allow a human to interact more naturally with an application.

SUMMARY

A processor-implemented method, motion capture system and tangible computer readable storage are provided for facilitating an interaction between a user and an application in a motion capture system.

To maximize the accessibility of an entertainment or other experience which is offered by a motion capture system, an intuitive technique is provided for translating user movements into commands. For example, the user may make hand gestures to navigate a menu, interact in a browsing or shopping experience, choose a game to play, or access communication features such as sending a message to a friend. In example approaches, the user controls a cursor to select an item from an on-screen menu, or to control the movement of an avatar in a 3-D virtual world. To facilitate the user's control, a physical interaction zone is defined in which the user's movements, such as hand movements, are tracked. The zone is sized, shaped and positioned based on the user's physical characteristics, to allow the user to comfortably access all portions of the display based on a natural biomechanical range of movement of the user.

In one embodiment, a processor-implemented method for tracking user movement in a motion capture system is provided. The method includes a number of processor-implemented steps. The method includes tracking a user's body in a field of view of the motion capture system, including determining a model of the user's body. For example, this can be a skeletal model which is based on common characteristics of the human body. Reference points of the model are determined, such as a shoulder line and head position, torso height, overall height and arm length. These reference points can be used to determine a size and position of the physical interaction zone. The zone is a 3-D volume in the field of view and has a coordinate system which is defined relative to at least one of the reference points. The method further includes tracking movement of a hand of the user in the zone relative to the coordinate system of the zone. Although tracking of the hand is discussed in detail, the principles provided can apply to tracking of other body parts, such as the legs, as well. Based on the tracking, the movement of the hand in the zone is translated to a corresponding action on a display, such as movement of a cursor, or movement of an avatar in 3-D virtual world. The display is thus updated based on the movement of the hand in the zone, based on a user-based coordinate system rather than a world-based coordinate system.

The zone can be anchored to the user so that the zone moves, e.g., as the user walks around in the field of view. As a result, a hand motion of the user can be detected regardless of whether the user is walking, or where the user is standing or sitting. Further, the zone can remain positioned between the user and a depth camera of the motion capture system, even as the user rotates his or her body away from the camera.

Moreover, the zone and the display can have different shapes. For example, the zone can be curved while the display is rectangular. Each point in the zone can be mapped to a corresponding point in the display so that the user can access the entire display while moving in a natural range of motion. For example, the user may move his or her hand from side to side, pivoting about the elbow, in a curved motion. This motion can be translated to a horizontal motion in the display, in one possible approach. The optimal mapping from the zone to the display may depend on different factors, including the input modalities of the application which is running on the display. Both 2-D movement, such as side to side hand motion, and 3-D movement, such as a forward push motion with the hand, can be used.

This summary is provided to introduce a selection of concepts in a simplified form that are further described below in the description. This summary is not intended to identify key features or essential features of the claimed subject matter, nor is it intended to be used to limit the scope of the claimed subject matter.

BRIEF DESCRIPTION OF THE DRAWINGS

In the drawings, like-numbered elements correspond to one another.

FIG. 2a depicts an example block diagram of the motion capture system of FIG. 1.

FIG. 2b depicts an example software stack which is implemented by the motion capture system of FIG. 1.

FIG. 5 depicts a method for facilitating a user's interaction with a motion capture system.

FIG. 6a depicts an example method for tracking movement of a person as set forth in step 500 of FIG. 5.

FIG. 6b depicts an example method for providing an input to an application based on user movement in one or more zones, as set forth in step 506 of FIG. 5.

FIG. 7a depicts an example method for determining a physical interaction zone for a user, as set forth in step 502 of FIG. 5.

FIG. 7b depicts another example method for determining a physical interaction zone for a user, as set forth in step 502 of FIG. 5.

FIG. 8 depicts an example method for processing an input at an application, as set forth in step 508 of FIG. 5.

FIG. 9a depicts an example model of a user as set forth in step 608 of FIG. 6a, with a physical interaction zone.

FIG. 9b depicts details of the physical interaction zone of FIG. 9a.

FIG. 9c depicts a profile view of the model of the user and the physical interaction zone of FIG. 9a.

FIG. 9d depicts details of the physical interaction zone as seen in FIG. 9c.

FIG. 11d depicts an example model of the user as set forth in step 608 of FIG. 6a, with a curved physical interaction zone having two subset zones, as seen in an overhead view, where the user's shoulder line is 45 degrees to the depth camera axis.

FIG. 11e depicts an example model of the user as set forth in step 608 of FIG. 6a, with a curved physical interaction zone having two subset zones, as seen in an overhead view, where the user's shoulder line is parallel to the depth camera axis.

FIG. 13d depicts mapping between points in a zone and corresponding points in a display, such as to cause the cursor movement of FIG. 13a.

FIG. 17b depicts an example physical interaction zone which is empty, corresponding to the display of FIG. 17a.

FIG. 17d depicts a user's hands in the example physical interaction zone of FIG. 17b, which causes the display of FIG. 17a.

DETAILED DESCRIPTION

Techniques are provided for allowing a user to easily interact with an application in a motion capture system. A depth camera system can track the movement of a user's body in a physical space and derive a model of the body, which is updated for each camera frame, several times per second. The model can be processed to identify reference points which indicate a size of the user and his or her stance or posture. Based on this information, a physical interaction zone can be defined relative to the user's position, such as for tracking movement of the user's hands and arms. By tailoring the zone to the individual user, the user can interact with an application using natural movements, so that the user's comfort level is improved, along with the user's ability to provide an accurate control input to the application. The zone may be active in certain modes of the application. In other modes, the application can receive an input which is based on full body tracking of the user, e.g., in a world-based coordinate system. Appropriate techniques for transitioning between the two modes can be provided.

Figure 1:
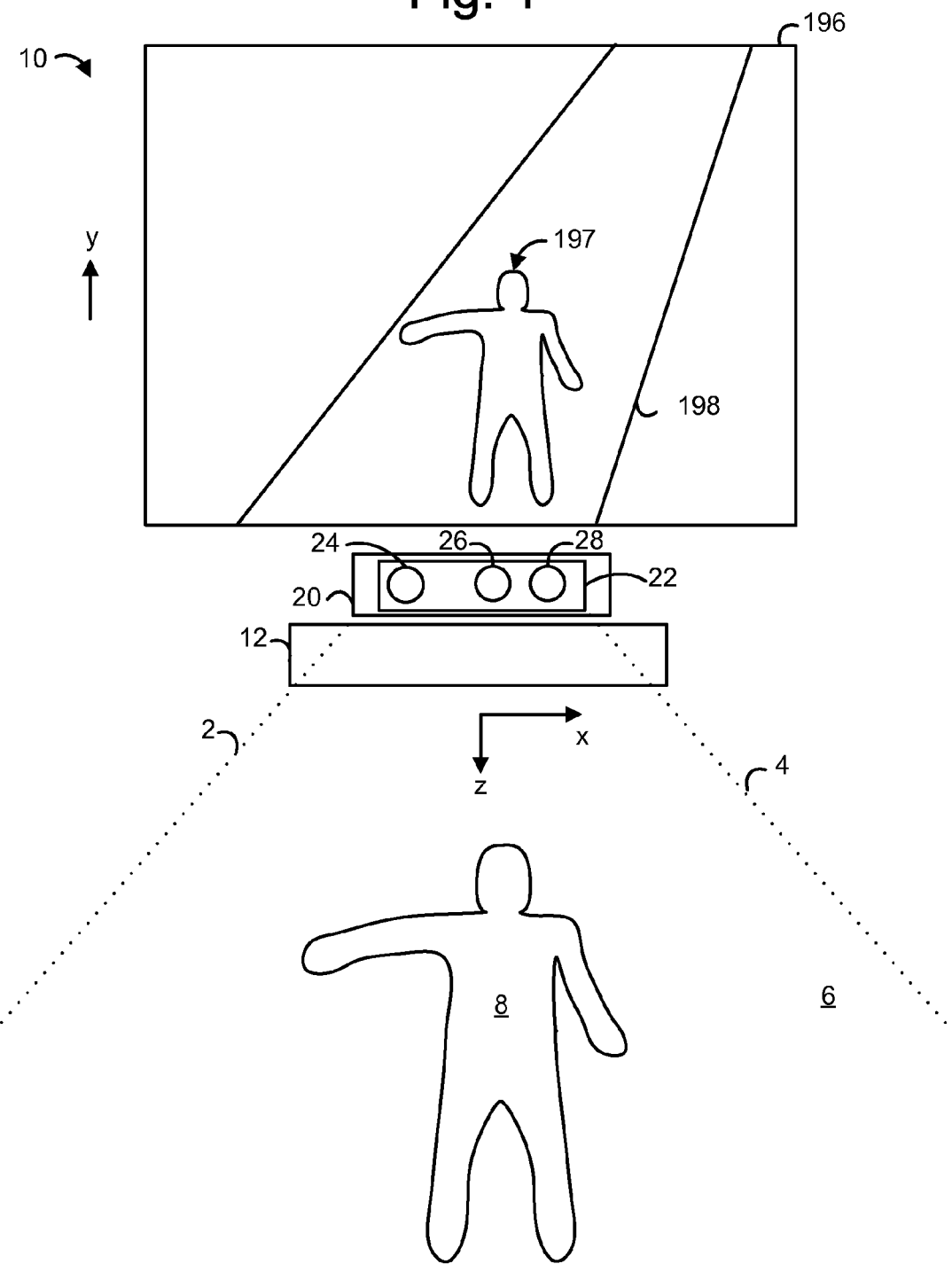
FIG. 1 depicts an example embodiment of a motion capture system.

FIG. 1 depicts an example embodiment of a motion capture system 10 in which a person 8 interacts with an application. The motion capture system 10 includes a display 196, a depth camera system 20, and a computing environment or apparatus 12. The depth camera system 20 may include an image camera component 22 having an infrared (IR) light component 24, a three-dimensional (3-D) camera 26, and a red-green-blue (RGB) camera 28. A user 8, also referred to as a person or player, stands in a field of view 6 of the depth camera. Lines 2 and 4 denote a boundary of the field of view 6. In this example, the depth camera system 20, and computing environment 12 provide an application in which an avatar 197 on the display 196 track the movements of the user 8. For example, the avatar may raise an arm when the user raises an arm. The avatar 197 is standing on a road 198 in a 3-D virtual world. A Cartesian world coordinate system may be defined which includes a z-axis which extends along the focal length of the depth camera system 20, e.g., horizontally, a y-axis which extends vertically, and an x-axis which extends laterally and horizontally. Note that the perspective of the drawing is modified as a simplification, as the display 196 extends vertically in the y-axis direction and the z-axis extends out from the depth camera system, perpendicular to the y-axis and the x-axis, and parallel to a ground surface on which the user 8 stands.

Generally, the motion capture system 10 is used to recognize, analyze, and/or track a human target. The computing environment 12 can include a computer, a gaming system or console, or the like, as well as hardware components and/or software components to execute applications.

The depth camera system 20 may include a camera which is used to visually monitor one or more people, such as the user 8, such that gestures and/or movements performed by the user may be captured, analyzed, and tracked to perform one or more controls or actions within an application, such as animating an avatar or on-screen character or selecting a menu item in a user interface (UI), as will be described in more detail below.

The motion capture system 10 may be connected to an audiovisual device such as the display 196, e.g., a television, a monitor, a high-definition television (HDTV), or the like, or even a projection on a wall or other surface, that provides a visual and audio output to the user. An audio output can also be provided via a separate device. To drive the display, the computing environment 12 may include a video adapter such as a graphics card and/or an audio adapter such as a sound card that provides audiovisual signals associated with an application. The display 196 may be connected to the computing environment 12 via, for example, an S-Video cable, a coaxial cable, an HDMI cable, a DVI cable, a VGA cable, or the like.

The user 8 may be tracked using the depth camera system 20 such that the gestures and/or movements of the user are captured and used to animate an avatar or on-screen character and/or interpreted as input controls to the application being executed by computer environment 12.

Some movements of the user 8 may be interpreted as controls that may correspond to actions other than controlling an avatar. For example, in one embodiment, the player may use movements to end, pause, or save a game, select a level, view high scores, communicate with a friend, and so forth. The player may use movements to select the game or other application from a main user interface, or to otherwise navigate a menu of options. Thus, a full range of motion of the user 8 may be available, used, and analyzed in any suitable manner to interact with an application.

The person can hold an object such as a prop when interacting with an application. In such embodiments, the movement of the person and the object may be used to control an application. For example, the motion of a player holding a racket may be tracked and used for controlling an on-screen racket in an application which simulates a tennis game. In another example embodiment, the motion of a player holding a toy weapon such as a plastic sword may be tracked and used for controlling a corresponding weapon in the virtual world of an application which provides a pirate ship.

The motion capture system 10 may further be used to interpret target movements as operating system and/or application controls that are outside the realm of games and other applications which are meant for entertainment and leisure. For example, virtually any controllable aspect of an operating system and/or application may be controlled by movements of the user 8.

FIG. 2a depicts an example block diagram of the motion capture system 10 of FIG. 1a. The depth camera system 20 may be configured to capture video with depth information including a depth image that may include depth values, via any suitable technique including, for example, time-of-flight, structured light, stereo image, or the like. The depth camera system 20 may organize the depth information into "Z layers," or layers that may be perpendicular to a Z axis extending from the depth camera along its line of sight.

The depth camera system 20 may include an image camera component 22, such as a depth camera that captures the depth image of a scene in a physical space. The depth image may include a two-dimensional (2-D) pixel area of the captured scene, where each pixel in the 2-D pixel area has an associated depth value which represents a linear distance from the image camera component 22.

The image camera component 22 may include an infrared (IR) light component 24, a three-dimensional (3-D) camera 26, and a red-green-blue (RGB) camera 28 that may be used to capture the depth image of a scene. For example, in time-of-flight analysis, the IR light component 24 of the depth camera system 20 may emit an infrared light onto the physical space and use sensors (not shown) to detect the backscattered light from the surface of one or more targets and objects in the physical space using, for example, the 3-D camera 26 and/or the RGB camera 28. In some embodiments, pulsed infrared light may be used such that the time between an outgoing light pulse and a corresponding incoming light pulse is measured and used to determine a physical distance from the depth camera system 20 to a particular location on the targets or objects in the physical space. The phase of the outgoing light wave may be compared to the phase of the incoming light wave to determine a phase shift. The phase shift may then be used to determine a physical distance from the depth camera system to a particular location on the targets or objects.

A time-of-flight analysis may also be used to indirectly determine a physical distance from the depth camera system 20 to a particular location on the targets or objects by analyzing the intensity of the reflected beam of light over time via various techniques including, for example, shuttered light pulse imaging.

In another example embodiment, the depth camera system 20 may use a structured light to capture depth information. In such an analysis, patterned light (i.e., light displayed as a known pattern such as grid pattern or a stripe pattern) may be projected onto the scene via, for example, the IR light component 24. Upon striking the surface of one or more targets or objects in the scene, the pattern may become deformed in response. Such a deformation of the pattern may be captured by, for example, the 3-D camera 26 and/or the RGB camera 28 and may then be analyzed to determine a physical distance from the depth camera system to a particular location on the targets or objects.

The depth camera system 20 may include two or more physically separated cameras that may view a scene from different angles to obtain visual stereo data that may be resolved to generate depth information.

The depth camera system 20 may further include a microphone 30 which includes, e.g., a transducer or sensor that receives and converts sound waves into an electrical signal. Additionally, the microphone 30 may be used to receive audio signals such as sounds that are provided by a person to control an application that is run by the computing environment 12. The audio signals can include vocal sounds of the person such as spoken words, whistling, shouts and other utterances as well as non-vocal sounds such as clapping hands or stomping feet.

The depth camera system 20 may include a processor 32 that is in communication with the image camera component 22. The processor 32 may include a standardized processor, a specialized processor, a microprocessor, or the like that may execute instructions including, for example, instructions for receiving a depth image; generating a grid of voxels based on the depth image; removing a background included in the grid of voxels to isolate one or more voxels associated with a human target; determining a location or position of one or more extremities of the isolated human target; adjusting a model based on the location or position of the one or more extremities, or any other suitable instruction, which will be described in more detail below.

The depth camera system 20 may further include a memory component 34 that may store instructions that are executed by the processor 32, as well as storing images or frames of images captured by the 3-D camera or RGB camera, or any other suitable information, images, or the like. According to an example embodiment, the memory component 34 may include random access memory (RAM), read only memory (ROM), cache, Flash memory, a hard disk, or any other suitable tangible computer readable storage component. The memory component 34 may be a separate component in communication with the image capture component 22 and the processor 32 via a bus 21. According to another embodiment, the memory component 34 may be integrated into the processor 32 and/or the image capture component 22.

The depth camera system 20 may be in communication with the computing environment 12 via a communication link 36. The communication link 36 may be a wired and/or a wireless connection. According to one embodiment, the computing environment 12 may provide a clock signal to the depth camera system 20 via the communication link 36 that indicates when to capture image data from the physical space which is in the field of view of the depth camera system 20.

Additionally, the depth camera system 20 may provide the depth information and images captured by, for example, the 3-D camera 26 and/or the RGB camera 28, and/or a skeletal model that may be generated by the depth camera system 20 to the computing environment 12 via the communication link 36. The computing environment 12 may then use the model, depth information, and captured images to control an application. For example, as shown in FIG. 2a, the computing environment 12 may include a gestures library 190, such as a collection of gesture filters, each having information concerning a gesture that may be performed by the skeletal model (as the user moves). For example, a gesture filter can be provided for various hand gestures, such as swiping or flinging of the hands. By comparing a detected motion to each filter, a specified gesture or movement which is performed by a person can be identified. An extent to which the movement is performed can also be determined.

The data captured by the depth camera system 20 in the form of the skeletal model and movements associated with it may be compared to the gesture filters in the gesture library 190 to identify when a user (as represented by the skeletal model) has performed one or more specific movements. Those movements may be associated with various controls of an application.

The computing environment may also include a processor 192 for executing instructions which are stored in a memory 194 to provide audio-video output signals to the display device 196 and to achieve other functionality as described herein.

FIG. 2b depicts an example software stack which is implemented by the motion capture system of FIG. 1. In an example technique discussed further below, the computing environment 12 may implement a software stack which includes a skeletal tracking component 191 at a lower level, a zone determination component 193 at an intermediate level, and an application 195 at a higher level.

Figure 3:
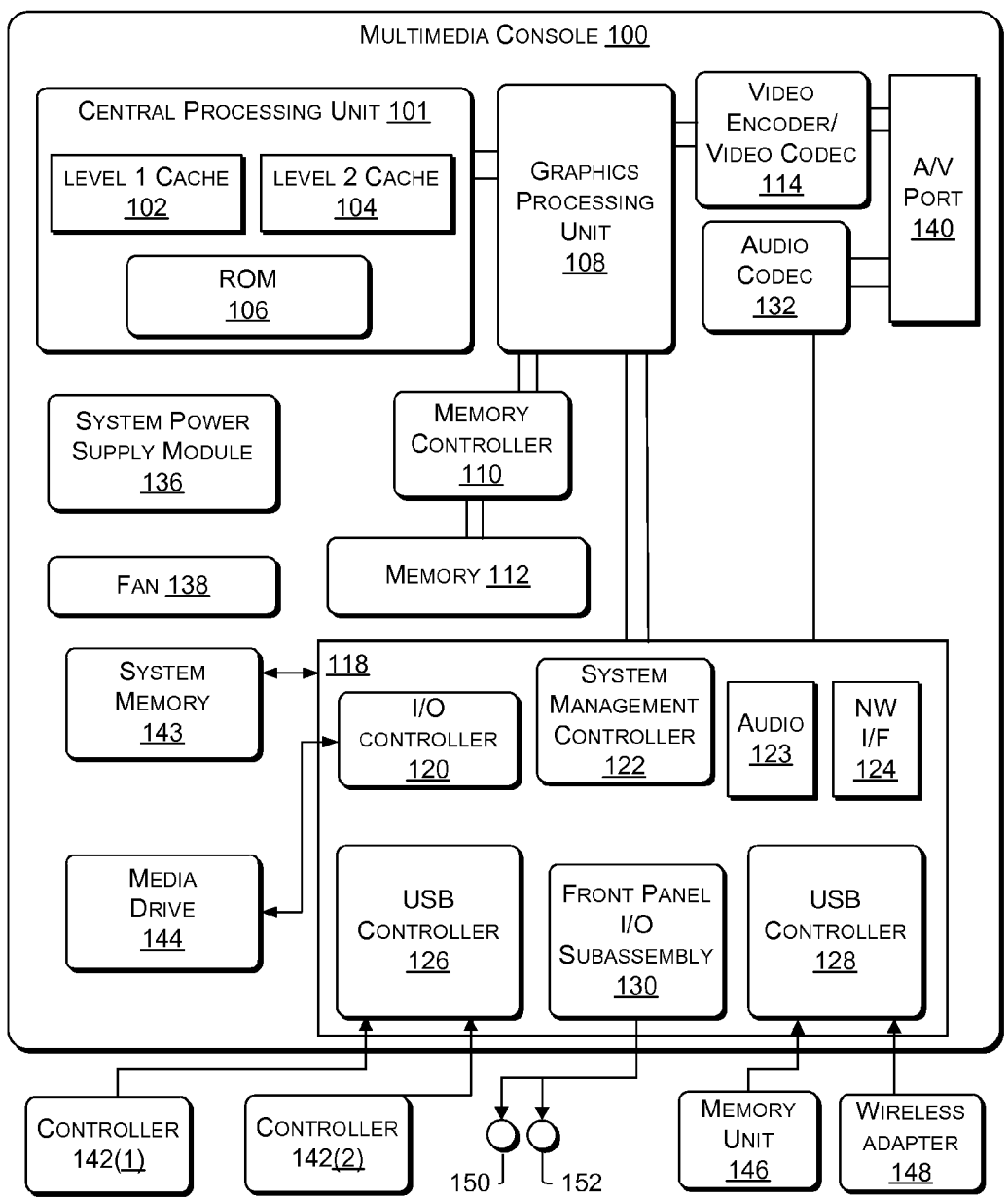
FIG. 3 depicts an example block diagram of a computing environment that may be used in the motion capture system of FIG. 1.

FIG. 3 depicts an example block diagram of a computing environment that may be used in the motion capture system of FIG. 1. The computing environment can be used to interpret one or more gestures or other movements and, in response, update a visual space on a display. The computing environment such as the computing environment 12 described above may include a multimedia console 100, such as a gaming console. The multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The memory 106 such as flash ROM may store executable code that is loaded during an initial phase of a boot process when the multimedia console 100 is powered on.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as RAM (Random Access Memory).

The multimedia console 100 includes an I/O controller 120, a system management controller 122, an audio processing unit 123, a network interface 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface (NW IF) 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection.

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures.

When the multimedia console 100 is powered on, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered on, a specified amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches. The console 100 may receive additional inputs from the depth camera system 20 of FIG. 2*a*, including the cameras 26 and 28.

Figure 4:
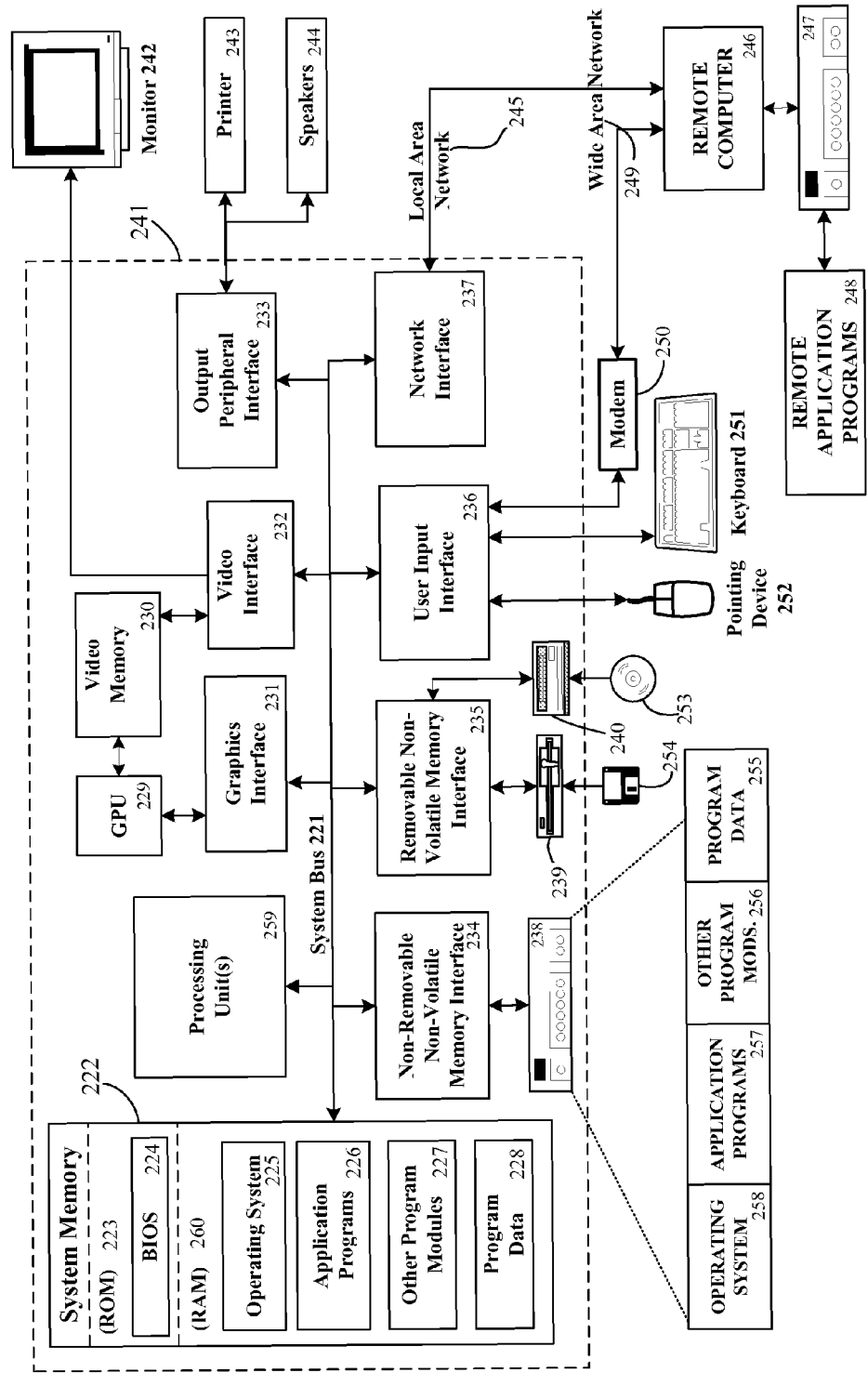
FIG. 4 depicts another example block diagram of a computing environment that may be used in the motion capture system of FIG. 1.

FIG. 4 depicts another example block diagram of a computing environment that may be used in the motion capture system of FIG. 1. The computing environment can be used to interpret one or more gestures or other movements and, in response, update a visual space on a display. The computing environment 220 comprises a computer 241, which typically includes a variety of tangible computer readable storage media. This can be any available media that can be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. A graphics interface 231 communicates with a GPU 229. By way of example, and not limitation, FIG. 4 depicts operating system 225, application programs 226, other program modules 227, and program data 228.

The computer 241 may also include other removable/non-removable, volatile/nonvolatile computer storage media, e.g., a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile tangible computer readable storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and depicted in FIG. 4, provide storage of computer readable instructions, data structures, program modules and other data for the computer 241. For example, hard disk drive 238 is depicted as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to depict that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The depth camera system 20 of FIG. 2, including cameras 26 and 28, may define additional input devices for the console 100. A monitor 242 or other type of display is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been depicted in FIG. 4. The logical connections include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 4 depicts remote application programs 248 as residing on memory device 247. It will be appreciated that the network connections shown are exemplary and other means of establishing a communications link between the computers may be used.

Physical Interaction Zone

FIG. 5 depicts a method for facilitating a user's interaction with a motion capture system. Generally, controlling an application based on a user's movements presents many challenges. For example, a display in a motion capture system may provide several objects scattered about according to an application such as a 3-D game. A user standing in front of the display has the ability to target and interact with one of those objects. However, the user does not know where to move his or her hand to select, grab, move or hit the object. Does the user move the hand a few inches to the right, or foot above his or her head? A solution to this challenge should provide an easy and intuitive way for the user to understand the relationship between his or her body and the objects on the display. Two elements can work together to establish this relationship: (1) a spatial mapping between the user's real-world physical space and the virtual-world screen space, and (b) some form of real-time on-screen feedback (visual and/or audio) which reveals that mapping.

A mapping between the real world and the virtual world works when the user in front of the display knows exactly where and how far to move in the physical world to interact with something in the virtual world. The nature of the mapping relationship depends on the desired activity of the user. For example, if a game requires physicality, such as actively jumping and moving side-to-side, like a soccer goalie, for instance, a mapping from a large real-world physical space to the virtual-world screen space is appropriate. Conversely, if a game demands very little movement, perhaps just movements of the arms and hands, a mapping from a small physical space around the upper body to the screen space is appropriate.

Two types of spatial mapping include world-based mapping and user-based mapping. In world- based mapping, the play space, that is, everything within the camera's field of view, is fixed. As a user moves around the play space, the camera tracks and identifies the user's movements in relation to the play space. World-based mapping generally involves full-body tracking, as in the above-mentioned example of a goalie. On the other hand, in user-based spatial mapping, what matters is how a user moves in relation to himself or herself, as opposed to how the user moves in relation to the surrounding world. User-based spatial mapping involves partial-body tracking (as in the arm and hand motions from the example above). For instance, a waving arm and hand, not movement from one side of the play space to the other, is what gets tracked. The relevant space is anchored to the user.

Within the framework of effective spatial mapping, the feedback returned to the user in response to the user's movements will help the user successfully interact with a game or other application. Most games will predominantly use full-body tracking, and in such cases the camera simply tracks the user's full body (skeleton). In this case, an intuitive form of on-screen user feedback is to represent the user's full body on the screen in the form of an avatar. However, some situations may benefit from a computationally less expensive partial-body tracking For example, this can be useful for interactions with traditional screen interfaces which include buttons, lists, menus, and so on, where full-body interaction is possible but is not necessary or desired. An effective way to provide this feedback is to display a cursor which is controlled by movement of the user's hand. For example, the cursor can move on the display in a 1:1 motion with the user's hand movements. This sort of interaction generally occurs within a field of motion called the physical interaction zone, or zone. A solution for spatial mapping can use the zone and its associated attributes, including size, shape and position.

In such a solution, described at a high level in FIG. 5, step 500 includes tracking a user in a field of view of a depth camera system. Step 500 is described also in connection with FIG. 6a. Step 502 includes determining one or more physical interaction zones for a user. Step 502 is described also in connection with FIGS. 7a, 7b and 9a-12. The zone can be calculated for each frame, even when the zone is inactive, in which case it is not used by the application. Step 506 includes providing an input to an application based on movement of the user relative to the one or more zones, using user-based coordinates. Step 506 is described also in connection with FIG. 6b. Step 508 includes processing an input at an application. Step 508 is described also in connection with FIGS. 8 and 13a-17j. The application decides based on its current context whether the zone input is relevant. Step 504 includes providing an input to an application based on full body tracking of the user, using world-based coordinates. For example, this can cause movement of an avatar, such as depicted in FIG. 1. In some cases, the zone input can be inactive so that only the full body tracking is used. The zone input mode can be activated when the application reaches a certain mode, such as when a game has been completed, and the application prompts the user to provide an input via a menu. In other cases, the zone input mode can be activated by the user, such as when the user places a hand in the zone. For example, placement of the hand in the zone, e.g., for a certain period of time such as 1-2 seconds, can be interpreted as a command by the application to enter a mode in which the user provides an input using the zone input mode.

FIG. 6a depicts an example method for tracking movement of a person as set forth in step 500 of FIG. 5. The example method may be implemented using, for example, the depth camera system 20 and/or the computing environment 12, 100 or 220 as discussed in connection with FIGS. 2a-4. One or more people can be scanned to generate a model such as a skeletal model, a mesh human model, or any other suitable representation of a person. In a skeletal model, each body part may be characterized as a mathematical vector defining joints and bones of the skeletal model. Body parts can move relative to one another at the joints.

The model may then be used to interact with an application that is executed by the computing environment. The scan to generate the model can occur when an application is started or launched, or at other times as controlled by the application of the scanned person.

The person may be scanned to generate a skeletal model that may be tracked such that physical movements or motions of the user may act as a real-time user interface that adjusts and/or controls parameters of an application. For example, the tracked movements of a person may be used to move an avatar or other on-screen character in an electronic role-playing game; to control an on-screen vehicle in an electronic racing game; to control the building or organization of objects in a virtual environment; or to perform any other suitable control of an application.

According to one embodiment, at step 600, depth information is received, e.g., from the depth camera system. The depth camera system may capture or observe a field of view that may include one or more targets. In an example embodiment, the depth camera system may obtain depth information associated with the one or more targets in the capture area using any suitable technique such as time-of-flight analysis, structured light analysis, stereo vision analysis, or the like, as discussed. The depth information may include a depth image having a plurality of observed pixels, where each observed pixel has an observed depth value, as discussed.

The depth image may be downsampled to a lower processing resolution so that it can be more easily used and processed with less computing overhead. Additionally, one or more high-variance and/or noisy depth values may be removed and/or smoothed from the depth image; portions of missing and/or removed depth information may be filled in and/or reconstructed; and/or any other suitable processing may be performed on the received depth information may such that the depth information may used to generate a model such as a skeletal model, discussed also in connection with FIGS. 9a, 9c, 10a-10c, 11a-11h, 12b and 12c.

At decision step 604, a determination is made as to whether the depth image includes a human target. This can include flood filling each target or object in the depth image comparing each target or object to a pattern to determine whether the depth image includes a human target. For example, various depth values of pixels in a selected area or point of the depth image may be compared to determine edges that may define targets or objects as described above. The likely Z values of the Z layers may be flood filled based on the determined edges. For example, the pixels associated with the determined edges and the pixels of the area within the edges may be associated with each other to define a target or an object in the capture area that may be compared with a pattern, which will be described in more detail below.

If decision step 604 is true, step 606 is performed. If decision step 604 is false, additional depth information is received at step 600.

The pattern to which each target or object is compared may include one or more data structures having a set of variables that collectively define a typical body of a human. Information associated with the pixels of, for example, a human target and a non-human target in the field of view, may be compared with the variables to identify a human target. In one embodiment, each of the variables in the set may be weighted based on a body part. For example, various body parts such as a head and/or shoulders in the pattern may have weight value associated therewith that may be greater than other body parts such as a leg. According to one embodiment, the weight values may be used when comparing a target with the variables to determine whether and which of the targets may be human. For example, matches between the variables and the target that have larger weight values may yield a greater likelihood of the target being human than matches with smaller weight values.

Step 606 includes scanning the human target for body parts. The human target may be scanned to provide measurements such as length, width, or the like associated with one or more body parts of a person to provide an accurate model of the person. In an example embodiment, the human target may be isolated and a bitmask of the human target may be created to scan for one or more body parts. The bitmask may be created by, for example, flood filling the human target such that the human target may be separated from other targets or objects in the capture area elements. The bitmask may then be analyzed for one or more body parts to generate a model such as a skeletal model, a mesh human model, or the like of the human target. For example, according to one embodiment, measurement values determined by the scanned bitmask may be used to define one or more joints in a skeletal model. The one or more joints may be used to define one or more bones that may correspond to a body part of a human.

For example, the top of the bitmask of the human target may be associated with a location of the top of the head. After determining the top of the head, the bitmask may be scanned downward to then determine a location of a neck, a location of the shoulders and so forth. A width of the bitmask, for example, at a position being scanned, may be compared to a threshold value of a typical width associated with, for example, a neck, shoulders, or the like. In an alternative embodiment, the distance from a previous position scanned and associated with a body part in a bitmask may be used to determine the location of the neck, shoulders or the like. Some body parts such as legs, feet, or the like may be calculated based on, for example, the location of other body parts. Upon determining the values of a body part, a data structure is created that includes measurement values of the body part. The data structure may include scan results averaged from multiple depth images which are provide at different points in time by the depth camera system.

Step 608 includes generating a model of the human target. In one embodiment, measurement values determined by the scanned bitmask may be used to define one or more joints in a skeletal model. The one or more joints are used to define one or more bones that correspond to a body part of a human.

One or more joints may be adjusted until the joints are within a range of typical distances between a joint and a body part of a human to generate a more accurate skeletal model. The model may further be adjusted based on, for example, a height associated with the human target.

At step 610, the model is tracked by updating the person's location several times per second. As the user moves in the physical space, information from the depth camera system is used to adjust the skeletal model such that the skeletal model represents a person. In particular, one or more forces may be applied to one or more force-receiving aspects of the skeletal model to adjust the skeletal model into a pose that more closely corresponds to the pose of the human target in physical space.

Generally, any known technique for tracking movements of a person can be used.

FIG. 6b depicts an example method for providing an input to an application based on user movement in one or more zones, as set forth in step 506 of FIG. 5. In one possible implementation, multiple zones are defined. For example, first and second zones may be defined, where the second zone is smaller than the first zone and overlaps, at least in part, with the first zone. See, e.g., FIG. 12b for further details. Step 620 includes processing data from user movement in the first zone. This data can include coordinates in a coordinate system of the first zone, where the coordinates represent a position of the user's hand at a point in time, such as for a camera frame. A reference position of the hand such as the fingertips can be used to represent the hand's position. Individual fingers might also be identified and have respective reference positions if there is sufficient resolution. Similarly, step 622 includes processing data from user movement in the second zone. This data can include coordinates in a coordinate system of the second zone, where the coordinates represent a position of the same user's hand, at the same point in time, as in step 620. Step 624 includes selecting a most appropriate zone.

For instance, if the user's hand, as represented by the reference position, has been contained within the smaller second zone for a certain amount of time, such as a 1-2 seconds, then the smaller second zone may be selected. Generally, the use of a smaller zone allows the user to more easily provide an input to an application, compared to a larger zone, although accuracy may be reduced due to the limited resolution of the depth camera system. For example, small hand movements, with pivoting from the wrist, and with the elbow in roughly a fixed position, may be contained within a smaller zone. On the other hand, the larger zone may be selected if the hand movements are not contained within the smaller zone.

This may occur when there is substantial pivoting from the elbow, for instance. Initially, the larger zones may be used, and the smaller zone possibly being selected based on the detected position of the hand over time. This approach can involve storing an ongoing record of hand position vs. time for a period of time. When more than two zones are used, the largest zone may be selected initially, then after determining a range of movement of the hand, the smallest zone which contains the hand movements may be selected.

In another approach, a user profile may indicate that a user tends to use small hand movement so that a corresponding small zone can be used.

Step 626 includes providing data from the user movement relative to the selected zone. This can include position coordinates in the coordinate system of the selected zone.

FIG. 7a depicts an example method for determining a physical interaction zone for a user, as set forth in step 502 of FIG. 5. Step 700 includes determining reference points from a skeletal model of a user. See, e.g., FIGS. 9a, 9c, 10a-10c, 11a-11h, 12b and 12c. Step 702 includes determining a stance of the user based on the reference points. For example, this can include determining a shoulder line, e.g., a line between the two shoulders of the user, and determining which of the shoulders is closest to the depth camera. See, e.g., FIGS. 11c-11f. Step 704 includes determining a size of the user based on the reference points. See, e.g., FIG. 9a. Step 706 includes determining a size and location of the zone, e.g., based on the size of the user and one or more reference points of the model. Step 708 includes optionally storing zone data to a user profile. The zone data can include data regarding the size and/or location of the zone, and the size of the user (e.g., height, dimensions L1 and L2, discussed in FIG. 9a, and so forth) for instance. In this approach, when the same user subsequently interacts with the application in another a session, the user can be identified and the zone data accessed based on the user's identity. The accessed zone data can be used for various purposes. In one possible approach, a history of zone data over time, such as days or weeks, is kept to analyze the user's movements, and to customize the zone size, shape and/or position accordingly.

For instance, by recording the range of movement of the hand, it may be determined that the user has reduced mobility in the hand and tends to make smaller motions than an average user. In this case, the zone size can be reduced correspondingly. An example of recording the range of movement of the hand may include recording (x, y, z) coordinates which the hand traverses at different times, recording the maximum distance the hand moves from a specified point in the coordinate system, such as the center, and so forth. Or, it may be determined that the user has reduced mobility in the right hand but not the left hand. In this case, the zone size for a right hand zone can be reduced correspondingly when the right hand is used, but the zone size for a left hand zone can be kept at a nominal size which is appropriate for an average user of the same size as the particular user. Or, the user may have preferences in movement which can be recorded and used to set the size and shape of the zone. For instance, the movements of a particular user can be compared to predefined average movements to determine deviations therefrom. Or, the system can determine that the user often reaches in the zone to cause a cursor to reach a menu item on a display, but fails to reach the menu item, e.g., undershoots, which indicates that the zone could be smaller. Or, the system can determine that the user often reaches in the zone to cause a cursor to reach a menu item on a display, but overshoots the menu item, which indicates that the zone could be larger.

Another possible approach is to provide a user interface which allows the user to explicitly set preferences regarding the zone. Or, the user interface can prompt the user to perform a series of motions and use the results to set the zone size, shape and position.

FIG. 7b depicts another example method for determining a physical interaction zone for a user, as set forth in step 502 of FIG. 5. The process of FIG. 7b may be performed after the process of FIG. 7a, for instance. Step 710 includes identifying the user, and accessing zone data from the corresponding user profile. The zone data may include, e.g., data regarding the size, shape and/or location of the zone. The user can be identified such as by the user logging into the application, e.g., by entering a user identifier, or by matching a currently-detected skeletal model of the user with a previously-stored model. Step 712 includes determining reference points from the currently-detected skeletal model of the user. Step 714 includes determining a stance of the user. Step 716 includes determining a size and location of the zone. Note that the size of the user does not have to be re-determined if it is stored with the zone data.

FIG. 8 depicts an example method for processing an input at an application, as set forth in step 508 of FIG. 5. The processing described can occur at the application level and/or any other level of software. In one possible approach, the application receives an input of the user's movement using world-based coordinates when the zone input is inactive (step 800). Based on the input, the display is updated at step 808, such as by causing an avatar to be displayed whose movements follow those of the user, or by providing another input which is based on a whole body movement of the user. The zone input may be inactive, e.g., when the application is in a mode in which the zone input is not used, such as when the user is playing a game using whole body movements, e.g., as a goalie. Or, the zone input may be inactive when the application has not received a command from the user to initiate the zone input.

At other times, the zone input is active, e.g., when the application is in a mode in which the zone input is used, such as a menu selection mode, or, the zone input may be active when the application has received a command from the user to initiate the zone input, such as the user placing a hand in the zone for a specified minimum amount of time. Activation of the zone may also depend on other factors, such as the user's stance or posture. When the zone input is active, at step 802, the application receives an input using user-based coordinates. The input can represent the position of a user's hand, for instance, in the zone, in terms of coordinates of the zone. In a Cartesian coordinate system, the position may be identified by (x, y, z) coordinates.

Step 804 includes determining display-based coordinates based on the user-based coordinates, e.g., using a mapping. See, e.g., FIG. 13a-13d. Step 806 includes optionally recognizing a gesture, such as a mid-air hand gesture. One example of a gesture is the hand moving a specific distance in the zone within a specified amount of time, e.g., in a swipe movement. Step 808 includes updating the display, such as by moving a cursor (see, e.g., FIGS. 13a-13d), selecting a menu item (see, e.g., FIGS. 14a-14c), scrolling a menu (see, e.g., FIGS. 15a-15c) or by moving an avatar (see, e.g., FIGS. 17a-17j).

FIG. 9a depicts an example model of a user as set forth in step 608 of FIG. 6a, with a physical interaction zone. The model 900 is facing the depth camera, in the -z direction, so that the cross-section shown is in the x-y plane. Note the vertical y-axis and the lateral x-axis. A similar notation is provided in other figures. The model includes a number of reference points, such as the top of the head 902, bottom of the head or chin 913, right shoulder 904, right elbow 906, right wrist 908 and right hand 910, represented by a fingertip area, for instance. Another approach is to represent the hand position by a central point of the hand. The model also includes a left shoulder 914, left elbow 916, left wrist 918 and left hand 920, represented by a fingertip area, for instance. A waist region 922 is also depicted, along with a right hip 924, right knew 926, right foot 928, left hip 930, left knee 932 and left foot 934. A shoulder line 912 is a line, typically horizontal, between the shoulders 904 and 914. An example zone 940 is depicted. In this example, the zone is a rectangular volume (which includes a square volume).

A size of the user can be determined based on the reference points. For example, a torso height L1 can be defined between the chin 913 and the waist 922, and an arm length L2 can be defined as a sum of the distances between the left shoulder 914 and the left elbow 916, and between the left elbow 916 and the left hand 920. The length of the shoulder line, between 904 and 914, can also be used.

FIG. 9b depicts details of the physical interaction zone of FIG. 9a. The zone includes a top surface 946 of width xw, side surfaces 944 and 948 of height yh, and bottom surface 942 of width xw. Further, the zone is defined relative to a coordinate system in which the origin is coincident in the z-axis direction with the right shoulder 904, in one possible implementation. That is, an imaginary line in the -z axis direction passes through the right shoulder 904 and the origin of the zone 940. The choice of the user's shoulder as the anchor point of the zone is only an example. Other potential choices include the center of the user's torso, the user's elbow, or various interpolated body points. The choice of anchor points is independent of the choice of origin in the coordinate space.

In this example, the side surface 944 of the zone is a distance xw1 from the shoulder point/origin 904, the side surface 948 of the zone is a distance xw2 from the shoulder point/origin 904, the top surface 946 of the zone is a distance yh1 from the shoulder point/origin 904, and the bottom surface 942 of the zone is a distance yh2 from the shoulder point/origin 904. The zone 940 can be symmetric in the x-direction about the shoulder point/origin 904, in which case xw1=xw2, or non-symmetric, in which case xw1≠xw2. Similarly, the zone 940 can be symmetric in the y-direction about the shoulder point/origin 904, in which case yh1=yh2, or non-symmetric, in which case yh1≠yh2. The position of the hand, as represented by the reference point 910, can be defined relative to the zone and its coordinate system by the coordinates (-x,y). The origin of the coordinate system can be at any desired position, whether within the zone or outside the zone.

FIG. 9c depicts a profile view of the model of the user and the physical interaction zone of FIG. 9a. The model 960 is seen in a cross-section in the y-z plane. The user's hand is held up in the zone 940. The forearm is in the zone as is a portion of the upper arm.

FIG. 9d depicts details of the physical interaction zone as seen in FIG. 9c. There is a distance zd1 along the z-axis between the left shoulder 904 and the rear surface 950 of the zone, a distance zd along the z-axis between the rear surface 950 of the zone and the front surface 954 of the zone, and a distance zd2 along the z-axis between the rear surface 950 of the zone and the hand 910, which is in a vertical plane 952. A position of the hand can be represented by (x, y, z) coordinates in a Cartesian coordinate system of the zone.

Generally, the physical interaction zone is a 3-D volumetric space tailored to fit the individual user, providing a spatial mapping relationship to a separate user interface screen. The size, shape, position, and composition of the zone enable users to comfortably and effectively perform 2-D and 3-D gestures within it to virtually interact with a UI, with no physical contact. Different zone sizes and shapes can be used for different situations and/or users. A zone can be defined using the following guidelines.

1. The zone size can be determined and adjusted automatically based on what the camera sees, e.g., in terms of the user's body dimensions, posture/stance, and other factors.

2. The zone position can be anchored to the user, as represented by one or more reference points on a model of the user, as a result of which the zone moves with the user. Moreover, as the user moves around or sits or stands in different places in the field of view, and/or in different positions, the user's body may rotate and not squarely align with the display. In this case, the zone can be automatically repositioned to remain between the user and the depth camera. This accommodates the user's mental model that in order to interact with the UI on the display, the user needs to gesture toward the display. A zone can be defined in terms of a minimum zone 1200, comfort zone 1202, performance zone 1204 and reach envelope zone 1206 (from smallest to largest). See, e.g., FIG. 12a. The comfort zone can be offset from the center of the user's body.

3. The comfort and minimum zones can further be defined separately for each hand.

4. The zone can be used as a mechanism to discern when a user engages and disengages from interactions with an application or the motion capture system.

5. The zone shape can be curved according to a user's natural biomechanical range of movement.

6. The zone can have different regions (subset zones) so that a different input is provided to an application based on detecting the user's hand in one of the subset zones, or detecting the user's hand crossing between zones, or entering or leaving a zone, for instance.

7. Zones which are smaller than a user's reach envelop can have external margins in which the camera is still accurately tracking the user in order to support features such as "gesture slamming" (see, e.g., FIGS. 16a-16c) and off-screen interactions.

The use of a zone can provide the following benefits:

1. Offers the user intuitive, accurate targeting control regardless of the position and orientation of the user, the TV screen or other display, or the camera.

2. Provides a consistent interaction model regardless of the screen size, resolution or aspect ratio. Any display, for example, regardless of size and shape, can be projected onto a given zone. Hand movements from one side of a zone to the other can cause movement of a cursor, avatar or other object from one side of the display to the other. Hand movement across, e.g., 30% of the zone can result in a 30% movement across the display, even when that same 30% covers different physical distances on different sized displays. In this case, there is a linear relationship or mapping between a distance moved by the hand and a distance moved on the display. It is also possible to provide a non-linear, e.g., exponential, relationship or mapping between a distance moved by the hand and a distance moved on the display. Different subset zones can also be associated with different mappings or trigger different actions on the display.

3. The zone can be customized to the user based on the user's body measurements, without requiring calibration or explicit customization by the user 4. The zone can be optimized for different gesture styles (e.g., accuracy and efficiency for pointing gestures, full range of movement for avateering—or causing movement of an avatar).

5. The implementation of a zone can be completely transparent to the user. The user does not need to explicitly understand or be made aware of the zone or its complexities.

6. The zone provides a mechanism by which users can engage and disengage with the system, being aware of when their actions are interactive and when they are not, mitigating the possibility of unintentional interaction. For example, when a user enters into a zone, the user engages with the UI, and when the user leaves the zone, the user disengages from the UI. For instance, when a user inserts a hand into the comfort zone, the user is engaging and can interact with the UI, and when the user removes the hand from the same zone, the user disengages. The UI can provide a visual and/or audio feedback when the user engages or disengages.

Use of pointing and manipulation gestures can be based on a relationship between the user's hand and on-screen UI elements. This relationship can be used, e.g., for engagement acknowledgement, tracking and orientation and targeting, selection, and manipulation. The relationship occurs in a physical 3-D space in front of the user's body, known as the physical interaction zone. The user can move his or her hand or hands within the zone or zones to interact with an on-screen UI.

Finding an appropriate zone size, shape, and position is useful to maximize effectiveness while ensuring comfort. To be effective, the zone should be large enough to accommodate the camera's limited spatial resolution and support discrete objects in the UI. The resolution of the camera determines how large a motion must be to be recognized by the system. A larger zone offers higher "resolution," thus mitigating the effects of camera noise and allowing for detection of more nuanced hand movements. To be comfortable, however, the zone should be small enough (and positioned appropriately) to avoid excessive extension and exertion by the user, which results in fatigue and inaccuracy. An optimal solution determines an appropriate size, shape, and position, and determines whether multiple zones should be used that correspond ideally with multiple movements or activities.

Figure 12A:
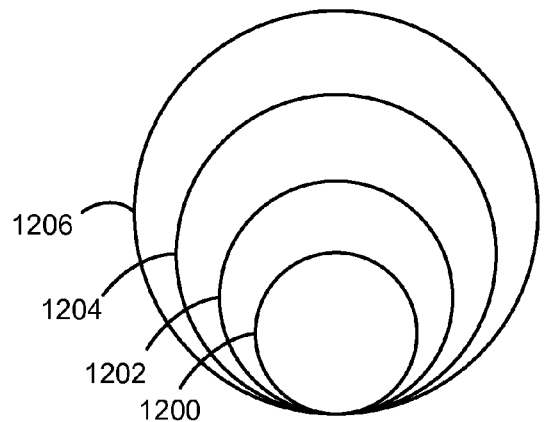
FIG. 12a depicts different sized zones as discussed in connection with FIG. 6b.

As mentioned in connection with FIG. 12a, four conceptual zone sizes can be defined, namely the minimum zone 1200, comfort zone 1202, performance zone 1204 and reach envelope zone 1206. Different zone sizes can be appropriate for different situations and users. Moreover, the system can dynamically switch between different zone sizes based on the current situation and/or user. The reach-envelope zone 1206 is the largest zone size for situations in which the user's entire body and range of motion needs to be tracked, such as for games that involve the use of a person's full body. The performance zone 1204 is a slightly smaller zone, and is based on a furthest reach of the user with acceptable performance, such as for performing symbolic gestures, and off-screen targeting or interactions. The comfort zone 1202 is sized based on a comfortable reach of the user, such as for performing pointing gestures and manipulating on-screen objects. The minimum zone is the smallest zone and is based on a user's ideal minimum movements for controlling an application, such as by providing wrist movements only.

A user's stance or posture may cause a change in zone size. For example, the comfort zone size for a standing user may be slightly larger compared to the size of the same comfort zone when the user is sitting. A user's body dimensions, obtained using the skeletal tracking system, can be used to size and fit the zone to each individual user. For example, the size of an adult's comfort zone will be larger than the size of a child's comfort zone. Thus, zone size can correspond to the size of the user. See, e.g., FIGS. 13b and 13c.

The actual size or dimensions of any zone can be an adjustable parameter. Generally speaking, the comfort zone size for a standing adult can have a width xw which is approximately 110% of the arm length (L2) and a height yh which is approximately the distance L1 from the chin 913 to the waist 922. The zone size could also be based on the user's height. See FIGS. 9a and 9b.

The zone is positioned relative to the user. For example, where hand-centric movements are concerned, the zone can be positioned in relation to the body where the hands naturally motion. When making comfortable motions, the hands do not often cross their body's midline. Consequently, it can be appropriate to provide a separate zone for each hand. The left-hand zone is offset toward the left side of the body, and the right-hand zone is offset toward the right. See FIG. 10c. Each zone is shifted off to the side of the user's body such that the user's elbow is close to horizontal center.

Along the z-axis or depth axis, the zone can be positioned from the user's body outward, or with a small gap between the user's body and the rear surface of the zone. Again, this can be an adjustable parameter. The zone is anchored to the user and follows the user as the user moves around within the camera system's large field of view. Consequently, as long as the user is within the camera's field of view, he/she can effectively interact with on-screen UI elements. This enables movement and multi-user engagement. The zone can be anchored to the body based on the shoulder line and head, rather than the elbow. This way, when a person rotates one way or another, the zone can maintain its position and remain anchored. If the user's body is not directly facing the camera of the display, the zone itself can automatically rotate around the user to appropriately position itself to stay between the user and the camera. See, e.g., FIGS. 11c-11e.

Generally, the user will gesture toward the display and not necessarily the camera since the display contains the elements with which the user interacts and controls. Although, the camera and display will typically be co-located. By keeping the zone between the user and the camera as the user rotates his or her body, the user's hand movements in the zone can continue to be detected, and an intuitive association between hand movements within the zone and any on-screen cursor or targeting system is maintained. The user is not forced to awkwardly keep the user's hand movements directly in front of the user's body while the display with which the user is interacting is off to the user's side.

Figure 10A:
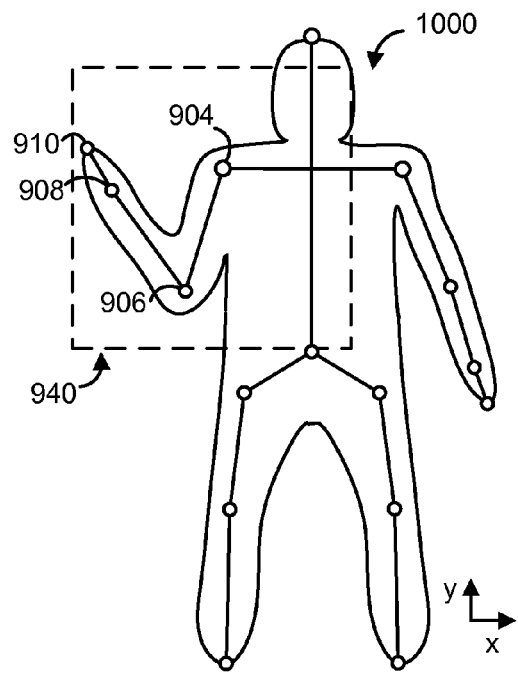
FIG. 10a depicts an example of the model of FIG. 9a, in which the user's hand position is changed.

FIG. 10a depicts an example of the model of FIG. 9a, in which the user's hand position is changed, as represented by the reference point 910. In this depiction 1000 of the model, a position of the reference point 910 can be identified by a corresponding set of (x, y, z) coordinates in a Cartesian coordinate system of the zone.

Figure 10B:
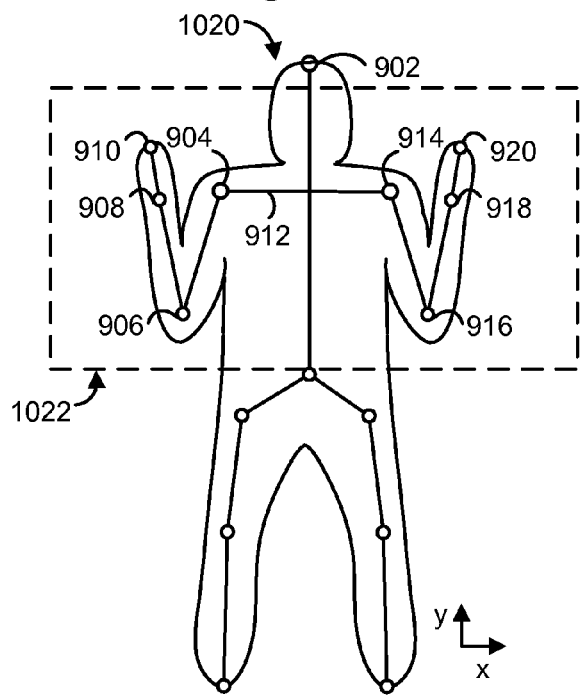
FIG. 10b depicts an example model of a user as set forth in step 608 of FIG. 6a, with a physical interaction zone which encompasses an expected range of movement of both of the user's hands.

FIG. 10b depicts an example model 1000 of a user as set forth in step 608 of FIG. 6a, with a physical interaction zone which encompasses an expected range of movement of both of the user's hands. In this depiction 1020 of the model, a single zone 1022 is defined. A user may use both hands to control a display. For example, one hand may select a menu item on the display, causing additional menu items to popup, while the other hand selects from the additional menu items. Or, both hands may be used to grasp and move an object in a virtual 3-D space. See, e.g., FIGS. 17a-17j.

Figure 10C:
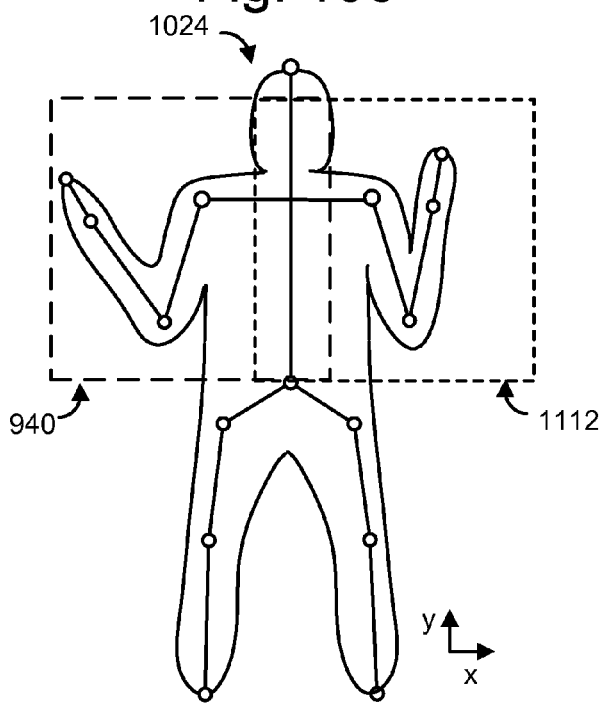
FIG. 10c depicts an example model of a user as set forth in step 608 of FIG. 6a, with two physical interaction zones, where each encompasses an expected range of movement of a respective hand.

FIG. 10c depicts an example model of a user as set forth in step 608 of FIG. 6a, with two physical interaction zones, where each encompasses an expected range of movement of a respective hand. In this depiction 1024 of the model, the previously-discussed zone 940 is used to define a position of the user's right hand (on the left side of the figure), and an additional zone 1112 is used to define a position of the user's left hand (on the right side of the figure).

Figure 11A:
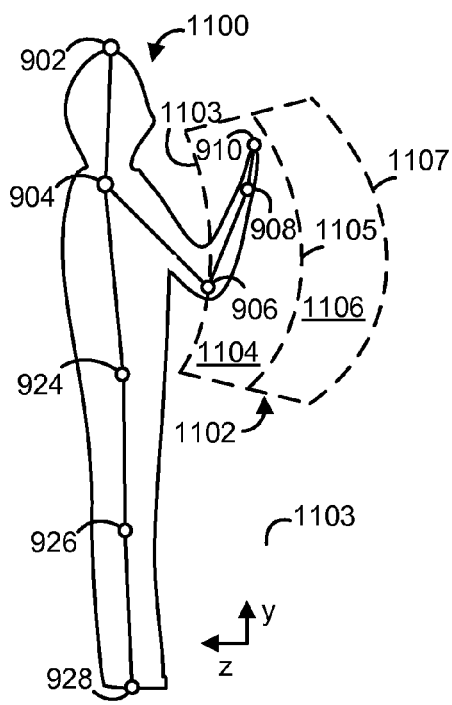
FIG. 11a depicts an example model of a user as set forth in step 608 of FIG. 6a, with a curved physical interaction zone having two subset zones, as seen in a profile view, where the user's hand is in the rearward subset zone.

FIG. 11a depicts an example model of a user as set forth in step 608 of FIG. 6a, with a curved physical interaction zone having two subset zones, as seen in a profile view, where the user's hand is in the rearward subset zone 1104. In this depiction 1100 of the model, a zone 1102 includes a first, rearward subset zone 1104, between boundary lines 1103 and 1105, which is closer to the user, and a second, forward subset zone 1106, between boundary lines 1105 and 1107, which is further from the user. Regarding the curvature, in one approach, the radius of curvature can differ for the different subset regions, or for the front of the zone relative to the back. Here, the radius of curvature for line 1103 is greater than the radius of curvature for line 1105, which in turn is greater than the radius of curvature for line 1107. In another possible approach, the radius of curvature is the same for lines 1103, 1105 and 1107.

While a cross-section of the zone 1102 in the y-z plane is depicted, the cross-section can be uniform or varying in the x direction. In one possible approach, the lines 1103, 1105 and 1105 are each part of a respective portion of a spherical surface, where line 1103 is part of a larger sphere than line 1105, and line 1105 is part of a larger sphere than line 1107. Other zone shapes are possible as well. The zone shape can conform to the natural biomechanical movement of the hand and arm.

Generally, the shape of the zone can be set as a compromise between two competing elements: (1) the user's intent to keep hand movement on a flat plane to match the flat display screen and (2) general body mechanics and fatigue that naturally introduce a curved movement. To this end, some zone boundaries can be curved, and the amount of curvature is an adjustable parameter. For example, horizontal planes within a zone can be curved, where the curvature increases further from the body. It is also possible for the curvature to be symmetrical or to vary such that the curvature toward the left will not match the curvature toward the right (for a right-handed zone, for example).

Similarly, vertical planes within a zone can be curved, where the curvature increases further from the body. The curvature can be symmetrical or vary such that curvature toward the top differs from the curvature toward the bottom of the zone.

Figure 11B:
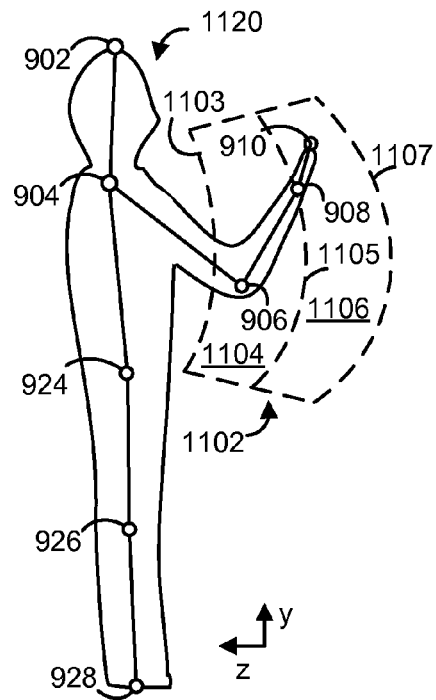
FIG. 11b depicts an example model of the user as seen in FIG. 11b, where the user's hand is in the forward subset zone.

FIG. 11b depicts an example model of the user as seen in FIG. 11b, where the user's hand is in the forward subset zone 1106. This depiction 1120 of the model may represent a push gesture which is performed by the user starting from the position in FIG. 11a.

Figure 11C:
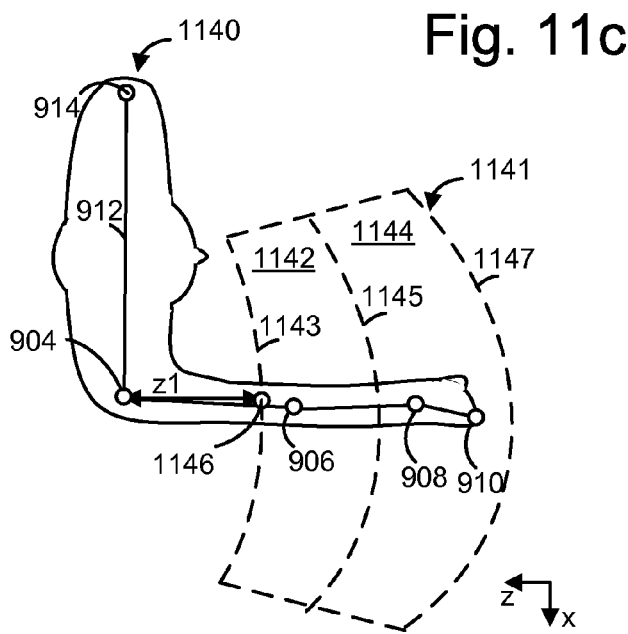
FIG. 11c depicts an example model of a user as set forth in step 608 of FIG. 6a, with a curved physical interaction zone having two subset zones, as seen in an overhead view, where the user's shoulder line is 90 degrees to the depth camera axis.

FIG. 11c depicts an example model of a user as set forth in step 608 of FIG. 6a, with a curved physical interaction zone having two subset zones, as seen in an overhead view, where the user's shoulder line is 90 degrees to the depth camera axis. In this depiction 1140 of the model, the previously-mentioned left side shoulder 904, right side shoulder 914, shoulder line 912, right side elbow 906, right side wrist 908 and right side hand 910 are shown. A curved zone 1141 having a first subset zone 1142, between boundary lines 1143 and 1145, and a second subset zone 1144, between boundary lines 1145 and 1147, is depicted. A point 1146 is an example reference point associated with the zone 1141, and is on the boundary line 1143. The point 1146 is a distance z1 along the z-axis from the right shoulder 1146. The point 1146 can be an origin of a coordinate system by which the zone 1141, and user movements in the zone, are defined.

Generally, any type of coordinate system can be used to described the zone and user movements within the zone.

Examples include the Cartesian coordinate system, curvilinear coordinate systems, and the polar coordinate systems, including circular, cylindrical and spherical coordinate systems. Moreover, a coordinate transformation can be performed to convert or map from one coordinate system to another in a known manner.

FIG. 11d depicts an example model of the user as set forth in step 608 of FIG. 6a, with a curved physical interaction zone having two subset zones, as seen in an overhead view, where the user's shoulder line is 45 degrees to the depth camera axis. In the depiction 1150 of the model, the user's left shoulder 914 is closer to the camera (which would be at the right in the figure, looking to the left, in the z-direction) than the right shoulder 904. The left shoulder 914 can therefore be selected as a reference point from which to locate the zone 1141, e.g., so that the reference point 1146 of the zone is at the distance zd from the reference point 1146, in the -z direction. This is an example of the zone being kept between the user and the camera as the user's body, as exemplified by the shoulder line 912, rotates in the field of view. By accommodating such rotation, the user is not forced to adopt a facing straight ahead stance to provide an input to an application.

FIG. 11e depicts an example model of the user as set forth in step 608 of FIG. 6a, with a curved physical interaction zone having two subset zones, as seen in an overhead view, where the user's shoulder line is parallel to the depth camera axis. In this depiction 1152 of the model, the user looks sideways toward the camera, in the -z direction. Again, the left shoulder 914 can be selected as a reference point from which to locate the zone 1141, e.g., so that the reference point 1146 of the zone is at the distance zd from the reference point 1146, in the -z direction. This is another example of the zone being kept between the user and the camera as the user's body, as exemplified by the shoulder line 912, rotates in the field of view.

Figure 11F:
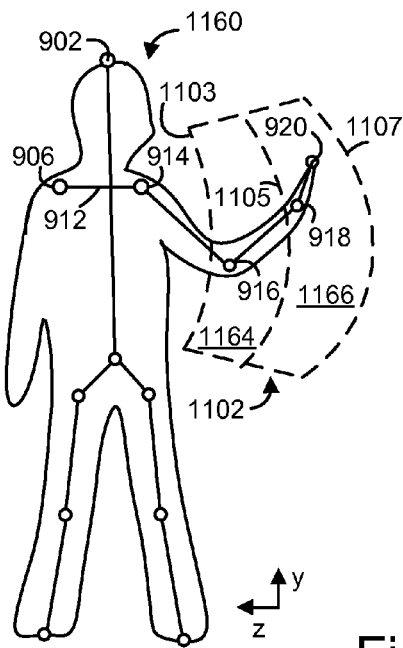
FIG. 11f depicts an example model of the user as set forth in step 608 of FIG. 6a, with a curved physical interaction zone having two subset zones, as seen in a profile view, where the user's shoulder line is parallel to the depth camera axis.

FIG. 11f depicts an example model of the user as set forth in step 608 of FIG. 6a, with a curved physical interaction zone having two subset zones, as seen in a profile view, where the user's shoulder line is parallel to the depth camera axis. The depiction 1160 of the model is shown relative to the same zone 1102 as in FIG. 11a and 11b. In this case, the user gestures and looks toward the camera.

Figure 11G:
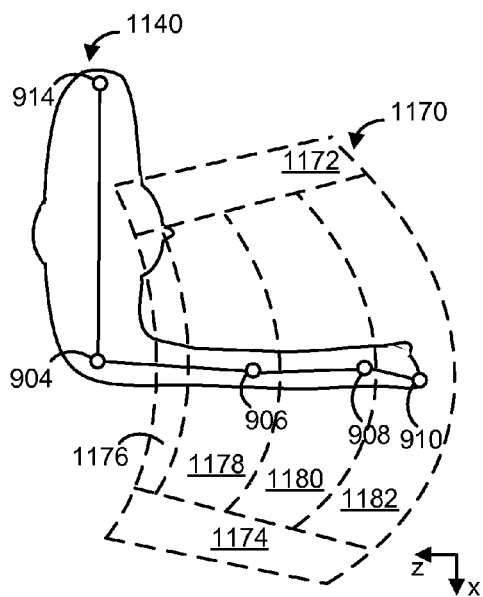
FIG. 11g depicts an example model of a user as set forth in step 608 of FIG. 6a, with a curved physical interaction zone having several subset zones, as seen in an overhead view.

FIG. 11g depicts an example model of a user as set forth in step 608 of FIG. 6a, with a curved physical interaction zone having several subset zones, as seen in an overhead view. The depiction 1140 of the model used in FIG. 11c is repeated, in which the user directly faces the camera, in the -z direction. However, a zone 1170 is provided which includes multiple subzones in front of the user, in the z direction, as well as laterally, in the x direction. A subzone is a portion of a zone. For example, subzones 1176, 1178, 1180 and 1182, referred to as depth subzones because they are at different depths relative to the camera, may be arranged one after another in the -z direction. A lateral subzone 1172 is at the user's left side and a lateral subzone 1174 is at the user's right side. Different actions can be triggered in an application when the user's hand is detected in particular subzones, transitions between particular subzones, and so forth.

Generally, the interior space within a zone can be one large undifferentiated space or partitioned into depth subzones and/or lateral subzones. The number, size, shape, and location of the subzones is an adjustable parameter. Subzones provide the system with yet another layer of information to offer different behaviors or features (e.g., change mode, UI feedback, and so forth) based on which subzone the user's hand is in.

For a depth subzone, a lateral subzone can be considered to be a margin (of the overall zone 1170) that borders a depth subzone or other central subzone or zone. Such margins can offer additional capabilities and benefits. For example, a user can perform 'gesture slamming' (see also FIGS. 15a-15c) to more easily target UI objects positioned at the edge or perimeter of a display by minimizing the precision needed to move to the edges. The user need only move the hand coarsely and quickly to the edge of a subzone (e.g., from subzone 1178, 1180, or 1182 to subzone 1172 or 1174), overshooting a depth zone boundary and entering a lateral zone, or even going further laterally past a lateral zone. The UI tracking feedback stays at the edge of the display, enabling the user to then move the hand up or down in a fine movement to target and select the desired item. The slamming movement can be detected, e.g., when the hand moves a minimum distance in the zone within a minimum time period.

Another example benefit or use involves continued interaction even when a user's hand extends beyond the edge of a subzone. For example, imagine a horizontal list of menu items that spans the entire width of a display (see, e.g., FIGS. 15a-15c). The user can move the hand to either end of the subzones 1178, 1180, or 1182 to scroll the list. Moving the hand further out laterally, to the lateral subzone 1172 or 1174, or even beyond the display/zone edge can increase scroll speed. The further out, the faster the scroll speed.

Another example of the use of subzones involves not disengaging a user when the user extends the hand in the z direction, just beyond a central subzone. A technique can be provided to allow the user to disengage from the system so that they stop affecting and interacting with the UI. One way for the user to disengage is to remove the hand from the zone. In this case, a subzone depth margin (e.g., subzone 1176) can provide a buffer so that the user is not penalized with disengagement when the hand accidentally crosses the zone boundary a little. Once in the margin, the user can be provided with feedback via the display and/or audio output, indicating that they are close to being disengaged. However, the user can remain engaged with the UI until the hand drops out of the bottom of the zone, or until a timer expires while the hand does not enter one of the central subzones 1178, 1180 and 1182, for instance.

In another example, the different depth subzones 1178, 1180 and 1182 provide different scrolling speeds or other UI response speeds, so that the further the user pushes the hand out away from the body, in the -z direction, the faster the response. Or, the subzones 1178 and 1180 can provide a common UI response speed, while the subzone 1182 provides a higher speed. Many variations are possible.

Figure 11H:
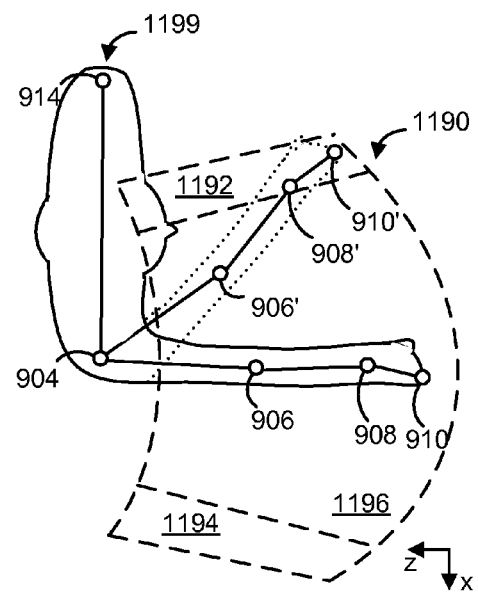
FIG. 11h depicts an example model of a user as set forth in step 608 of FIG. 6a, with a curved physical interaction zone having three subset zones, as seen in an overhead view.

FIG. 11h depicts an example model of a user as set forth in step 608 of FIG. 6a, with a curved physical interaction zone having three subset zones, as seen in an overhead view. In the depiction 1199 of the model, the right arm is shown in a first position, with reference points for the elbow 906, wrist 908 and hand 910, and in a second position, with reference points for the elbow 906', wrist 908' and hand 910'. The zone 1190 has a similar overall size to the zone 1170 of FIG. 11g, but three subzones are provided. A central subzone 1196 is provided, along with a left side lateral subzone 1192, and a right side lateral subzone 1194. An example of the gesture slamming discussed above could be represented by movement of the hand from the reference point 910 to the reference point 910'. A condition can also be applied that the gesture slamming requires the hand to move a specified distance within a specified time. Note that the specified distance can vary with the user size and zone size, so that the distance is smaller when the zone is smaller. Another condition can be applied that the gesture slamming requires the hand to move from the subzone 1196 to, or past, one of the lateral subzones 1192 or 1194.

FIG. 12*a* depicts different sized zones as discussed in connection with FIG. 6*b*. As mentioned, the zones can include the minimum zone 1200, comfort zone 1202, performance zone 1204 and reach envelope zone 1206. While circles are shown to illustrate the concept of different zone sizes, the actual zone shape can vary. Typically, the zones overlap, at least in part. Moreover, it is possible to use more than one zone size and/or shape, and to transition between the use of different zone sizes/shapes in specified situations.

Figure 12B:
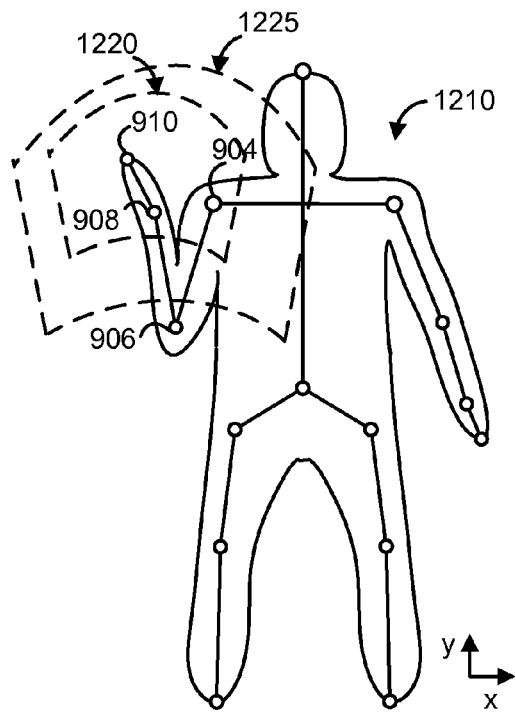
FIG. 12b depicts an example model of the user as set forth in step 608 of FIG. 6a, with larger and smaller sizes of curved physical interaction zones.

FIG. 12*b* depicts an example model of the user as set forth in step 608 of FIG. 6*a*, with larger and smaller sizes of curved physical interaction zones. In the depiction 1210 of the model of the user, the left arm is down by the user's side and therefore no zone for that arm is active. However, the right arm is up and the user is moving the right hand. Initially, a large zone 1225 can be used. After the user's movements have been observed for a period of time, it may be concluded that the movements are substantially confined to a smaller region, so that the system can switch to using the zone 1220 instead. In another possible option, the system learns that a particular user tends to make hand motions which are confined to a smaller region, so that the smaller zone 1220 can be used initially when the user is identified. This tendency to make hand motions within a certain volume can be recorded as data with the user's profile, discussed previously.

Figure 12C:
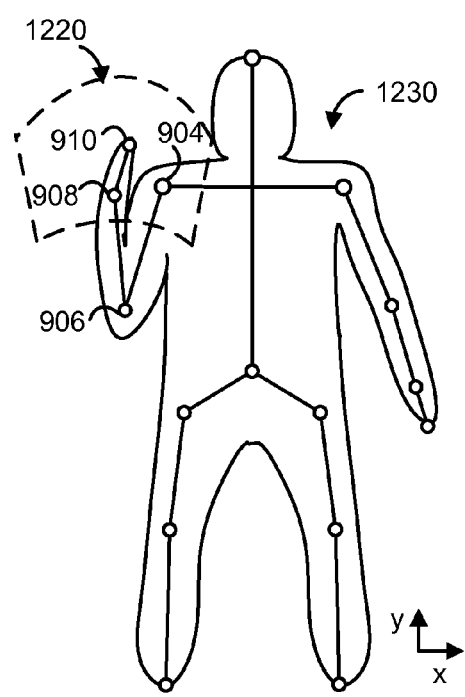
FIG. 12c depicts an example of the model of FIG. 12b, in which the user's hand position is changed, but is contained within the smaller zone.

FIG. 12*c* depicts an example of the model of FIG. 12*b*, in which the user's hand position is changed, but is contained within the smaller zone. The depiction 1230 of the model shows that the user moves the hand a relatively small amount, pivoting from the wrist, without substantially changing the arm position. Again, the movement of the hand can be tracked based on movement of the example reference point 910.

Figure 13A:
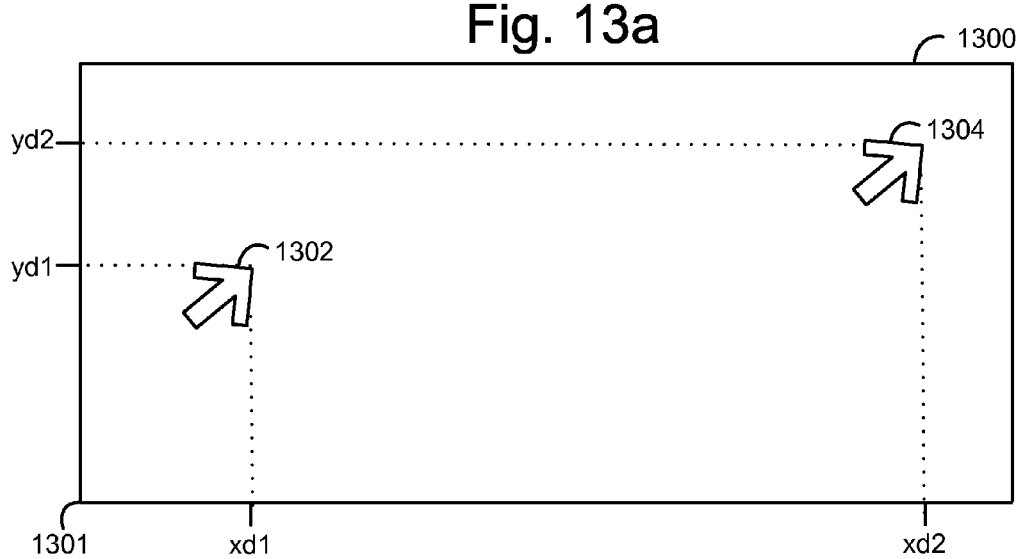
FIG. 13a depicts an example display in which a cursor is moved between two positions based on a user's hand movements, as an example of processing an input at an application as set forth in step 508 of FIG. 5.
Figure 13B:
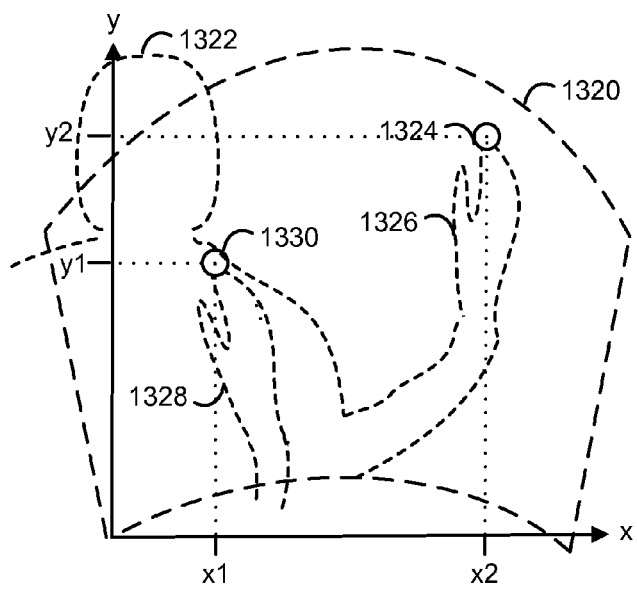
FIG. 13b depicts a user's hand movements which cause the cursor movement of FIG. 13a, for a user who is relatively large.
Figure 13C:
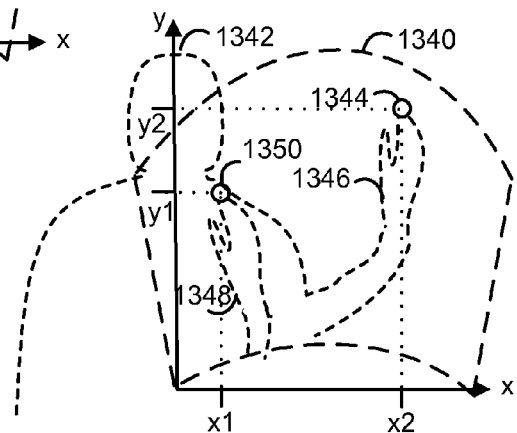
FIG. 13c depicts a user's hand movements which cause the cursor movement of FIG. 13a, for a user who is relatively small.

FIG. 13*a* depicts an example display in which a cursor is moved between two positions based on a user's hand movements, as an example of processing an input at an application as set forth in step 508 of FIG. 5. FIG. 13*b* depicts a user's hand movements which cause the cursor movement of FIG. 13*a*, for a user who is relatively large. FIG. 13*c* depicts a user's hand movements which cause the cursor movement of FIG. 13*a*, for a user who is relatively small.

As mentioned, the user's movement can be mapped from the coordinate system of a zone to a coordinate system of a display 1300, even when the zone is curved and the display is rectangular. For example, the zone may have a Cartesian coordinate system with x and y axes as shown, where the origin of the coordinate system is at the lower left of the zone. The z axis can extend out of the page. Note that movements can be tracked in 2-D or 3-D. Further, since the zone is scaled to the size of the user, a smaller user can comfortably access all portions of the display just as a larger user can.

For example, a larger zone 1320 is provided for a larger user 1322, in FIG. 13*b*. When the hand depicted by model 1326, and as represented by reference point 1324, is in a first position at zone coordinates (x2, y2), the cursor in the display can be moved to a corresponding first position 1304 at display coordinates (xd2, yd2). When the hand depicted by model 1328, and as represented by reference point 1330, is in a second position at zone coordinates (x1, y1), the cursor in the display can be moved to a corresponding second position 1302 at display coordinates (xd1, yd1). The cursor can move to different locations on the display between locations 1304 and 1302 as the hand is moved from the first to the second location in the zone.

Similarly, a smaller zone 1340 is provided for a smaller user 1342, in FIG. 13*c*. When the hand depicted by model 1346, and as represented by reference point 1344, is in a first position at zone coordinates (x2, y2), the cursor in the display can be moved to the corresponding first position 1304 at display coordinates (xd2, yd2). When the hand depicted by model 1348, and as represented by reference point 1350, is in a second position at zone coordinates (x1, y1), the cursor in the display can be moved to the corresponding second position 1302 at display coordinates (xd1, yd1). As before, the cursor can move to different locations between locations 1304 and 1302 as the hand is moved from the first to the second location in the zone.

FIG. 13*d* depicts mapping between points in a zone and corresponding points in a display, such as to cause the cursor movement of FIG. 13*a*. As mentioned, each point in a zone can be mapped to a respective point on the display using any mapping technique. Here, the zone 1320 of FIG. 13*d* is repeated, along with the display 1300. As represented by the arrows, an upper left point 1370 of the zone is mapped to an upper left point 1371 of the display, an upper middle point 1372 of the zone is mapped to an upper middle point 1373 of the display, and an upper right point 1374 of the zone is mapped to an upper right point 1375 of the display. Similarly, a lower left point 1376 of the zone is mapped to a lower left point 1377 of the display, and a lower right point 1378 of the zone is mapped to a lower right point 1379 of the display. Also, a curved middle line 1380 in the zone is mapped to a horizontal line 1381 in the display. Other points in the zone which are intermediate to the points mentioned can be mapped correspondingly to intermediate points in the display.

As mentioned, hand movement across, e.g., 30% of the zone can result in a 30% movement across the display, in a linear mapping, even when that same 30% covers different physical distances on different sized displays. Or, a non-linear mapping may be used, e.g., in which hand movement across, e.g., 30% of the zone results in a 50% movement across the display. Moreover, positioning the hand at the left edge of the zone cause the cursor to move to the left edge of the display. The same zone can be mapped to any television, monitor or other display, regardless of the size, aspect ratio or resolution of the display. Also, the zone and the display can have any shape. Typically, the display will be rectangular but this is not required. For example, a projected display can assume various shapes.

Figure 14A:
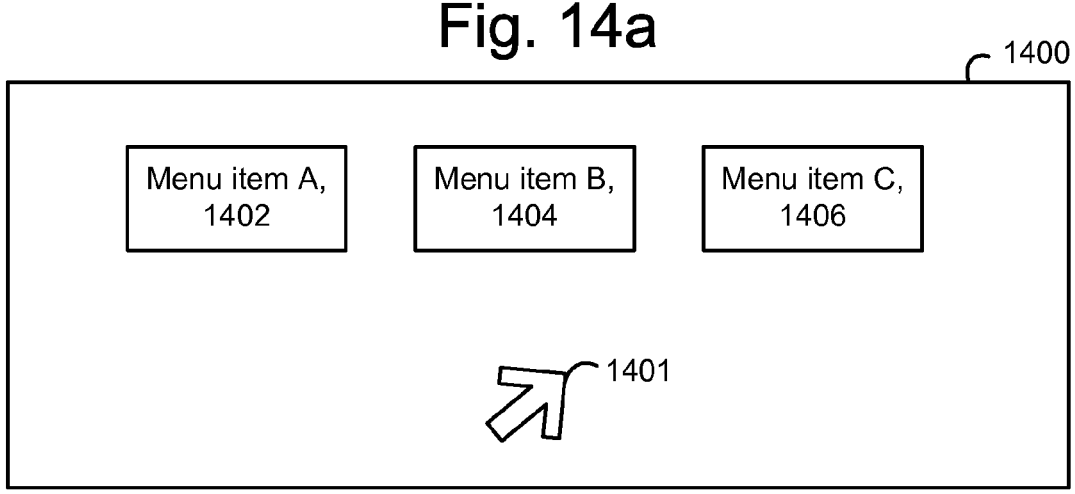
FIG. 14a depicts an example display which includes menu items for selection by a user, as an example of processing an input at an application as set forth in step 508 of FIG. 5.

FIG. 14*a* depicts an example display which includes menu items for selection by a user, as an example of processing an input at an application as set forth in step 508 of FIG. 5. The display 1400 includes a menu item A 1402, a menu item B 1404 and a menu item C 1406. The menu items can be used for any type of interface, such as for online shopping or browsing, viewing television schedules and selecting programs to view or record, selecting a game to play, selecting communication options such as friends to communicate with, configuring system settings, and so forth. This is an example of a 2-D display. The cursor may appear at an initial position 1401 when the zone is active. The user can then make a hand movement, for instance, to move the cursor to view and select a menu item. As an example, the user may hold the arm up in the zone with the palm facing forward, such as shown in FIG. 9*c*. To move the cursor higher in the display, the user might move the hand higher in the zone.

Figure 14B:
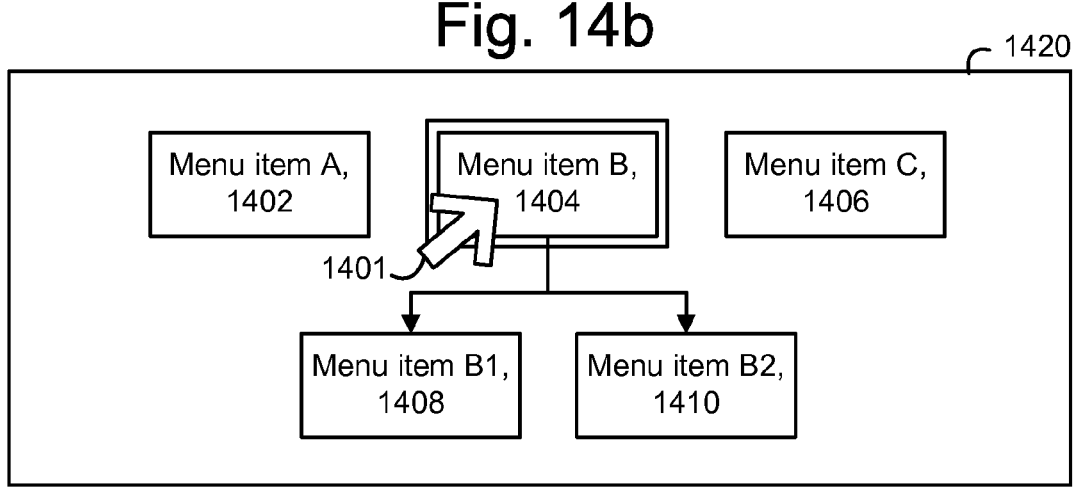
FIG. 14b depicts the example display of FIG. 14a after a user has caused the cursor to move over one of the menu items, resulting in additional menu options appearing.

FIG. 14*b* depicts the example display of FIG. 14*a* after a user has caused the cursor to move over one of the menu items, resulting in additional menu options appearing. In this depiction 1420 of the display, the user has move the cursor to the menu item B 1404, selecting that item, and causing additional related menu options to popup, namely menu item B1 1408 and menu item B2 1410. In one approach, when the cursor has been moved over a menu option for a certain amount of time, e.g., 0.5-1 sec., the menu item is considered to be selected, without further movement by the user. A thick border around the menu item B 1404 may indicates that the item has been selected. Other visual and/or audio feedback techniques may be used as well to identify a selected item. In another approach, the user makes an affirmative action to select a menu item, such as moving the hand forward as if pushing on the menu item. A push can be triggered based on, e.g., detecting the hand moving a specified distance in the zone along the -z axis within a specified time, for instance. Again, the distance can be tailored to the user for comfort, so that the distance is larger when the user is larger.

Figure 14C:
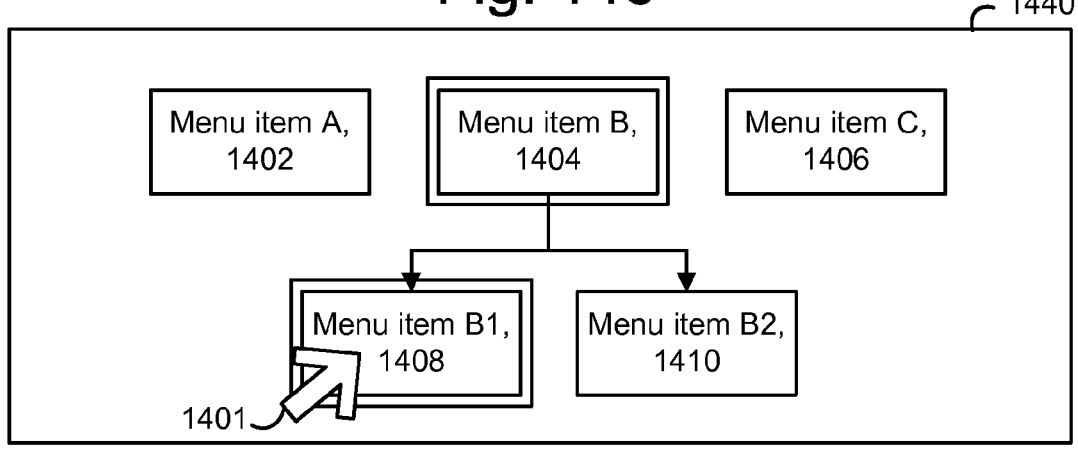
FIG. 14c depicts the example display of FIG. 14b after a user has caused the cursor to move over one of the additional menu options.

FIG. 14c depicts the example display of FIG. 14b after a user has caused the cursor to move over one of the additional menu options. In this depiction 1440 of the display, the user may move the hand lower in the zone to cause the cursor to move over the menu item B1 1408, for instance, selecting that item, and causing the application to take a corresponding action. In some cases, additional menu items may subsequently appear from which an additional selection is made by the user.

Figure 15A:
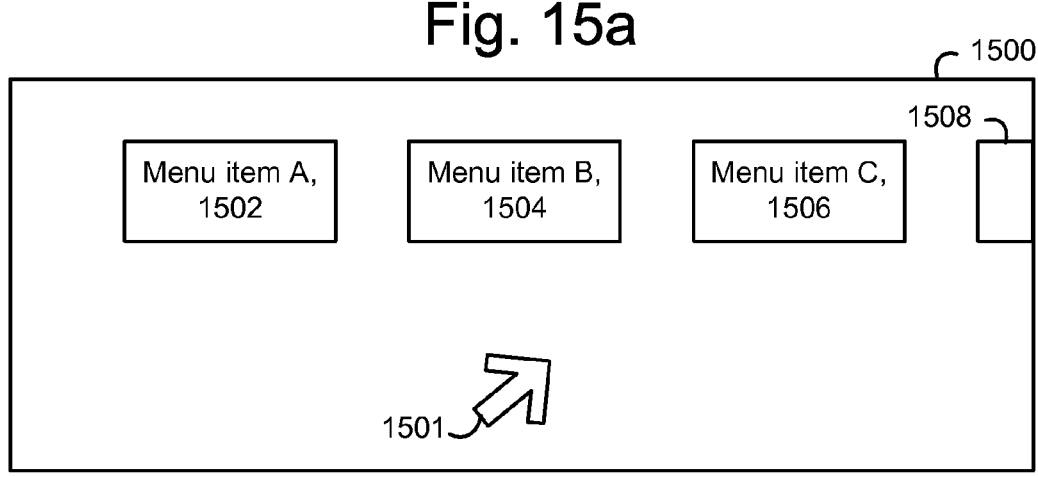
FIG. 15a depicts an example display which includes menu items for selection by a user, as an example of processing an input at an application as set forth in step 508 of FIG. 5.

FIG. 15a depicts an example display which includes menu items for selection by a user, as an example of processing an input at an application as set forth in step 508 of FIG. 5. An example of scrolling a list or menu is depicted. In this case, a fixed number of menu items are displayed at a time, e.g., 3, and additional menu items can be viewed by rotating them into position in the display while other items are rotated off the display. Scrolling can be horizontal, as in this example, or vertical. Initially, the display 1500 includes a menu item A 1502, a menu item B 1504, a menu item C 1506 and a portion of a menu item D 1508. The cursor 1501 is also in an initial position. To scroll the menu, the user can perform a gesture such as moving the hand from right to left in the zone. A scroll gesture may be detected by movement of a specified distance within a specified time in the zone, for instance, in a swipe motion. When the scroll gesture is detected, the menu scrolls across from right to left. In one possible approach, the menu scrolls by one item, so that the display of FIG. 15b is obtained.

Figure 15B:
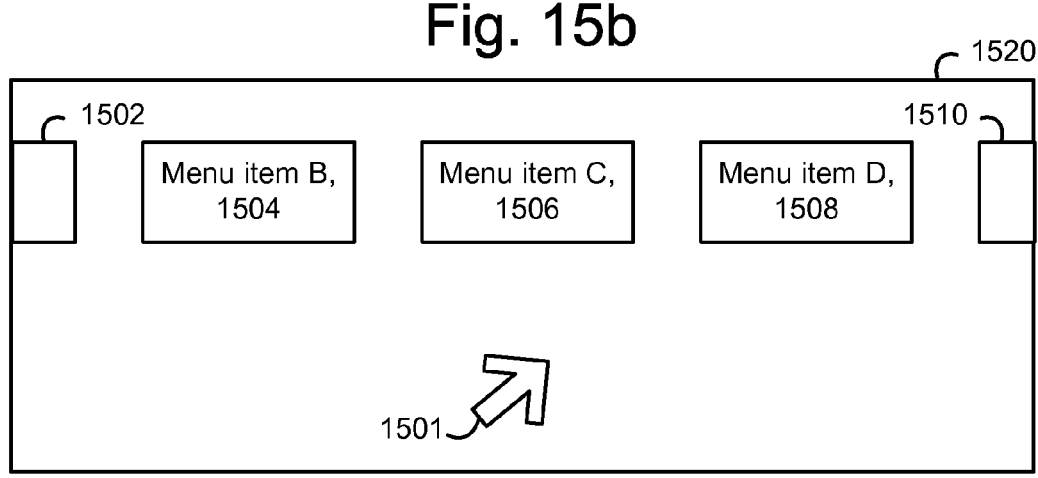
FIG. 15b depicts the example display of FIG. 15a after a user has caused the menu items to scroll from right to left, resulting in an additional menu option appearing.

FIG. 15b depicts the example display of FIG. 15a after a user has caused the menu items to scroll from right to left, resulting in an additional menu option appearing. The depiction 1520 of the display includes a portion of the menu item A 1502, the menu item B 1504 in full, the menu item C 1506 in full, and the menu item D 1508 in full. A portion of an additional menu item 1510 also appears. In another possible approach, the menu scrolls by more than one item. The number of items by which the menu scrolls can be a function of the distance and/or speed of the hand motion. The user can perform another scroll gesture in the same direction (right to left) to scroll the menu further to the left. Or, the user can perform a scroll gesture in the opposite direction (left to right) to scroll the menu back to the right. Assuming no further scrolling is desired by the user, the display of FIG. 15c is obtained.

Figure 15C:
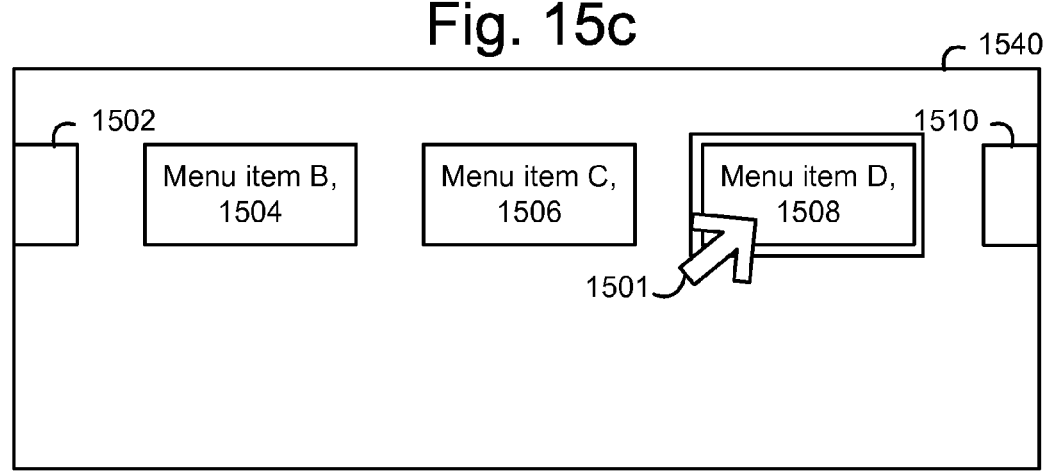
FIG. 15c depicts the example display of FIG. 15b after a user has caused the cursor to move over the additional menu item.

FIG. 15c depicts the example display of FIG. 15b after a user has caused the cursor to move over the additional menu item. In this depiction 1540 of the display, the user has performed a movement in the zone which causes the cursor 1501 to move to the menu item D 1508, selecting that item, as indicated by the thickened border.

Figure 16A:
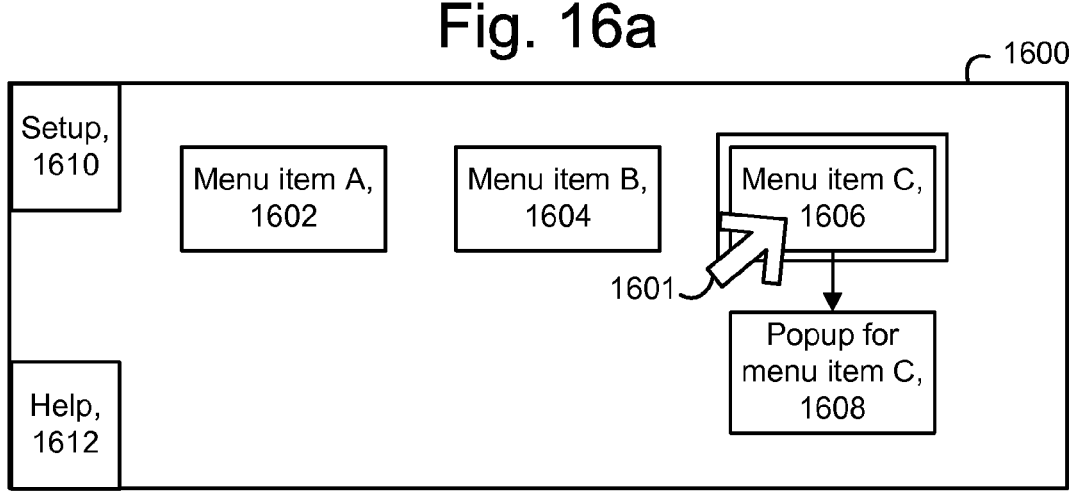
FIG. 16a depicts an example display which includes menu items for selection by a user, as an example of processing an input at an application as set forth in step 508 of FIG. 5.

FIG. 16a depicts an example display which includes menu items for selection by a user, as an example of processing an input at an application as set forth in step 508 of FIG. 5. An example of gesture slamming, discussed previously, is provided. A depiction 1600 of a display includes a menu item A 1602, a menu item B 1604, a menu item C 1606, and a popup for menu item C 1608. The display also includes a setup item 1610 at the upper left hand portion of the display, and a help item 1612 at a lower left hand portion of the display. The cursor 1601 is currently over the menu item C 1606 in a non-edge position. Assume the user wishes to select the setup item 1610, for instance. In one possible approach, the user moves the hand a controlled distance in the zone which corresponds to the distance in the display between the menu item C 1606 and the setup item 1610.

Figure 16B:
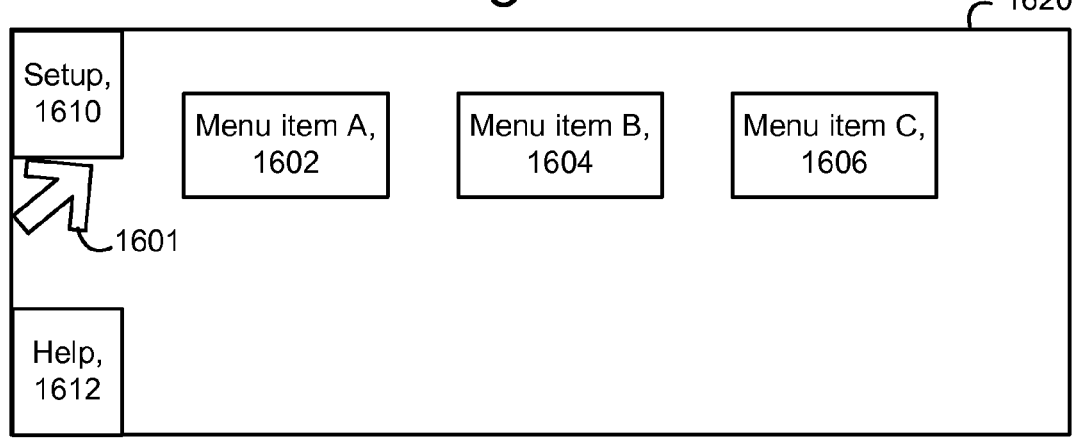
FIG. 16b depicts the example display of FIG. 16a after a user has caused the cursor to move to an edge region of the display with a coarse hand movement.
Figure 16C:
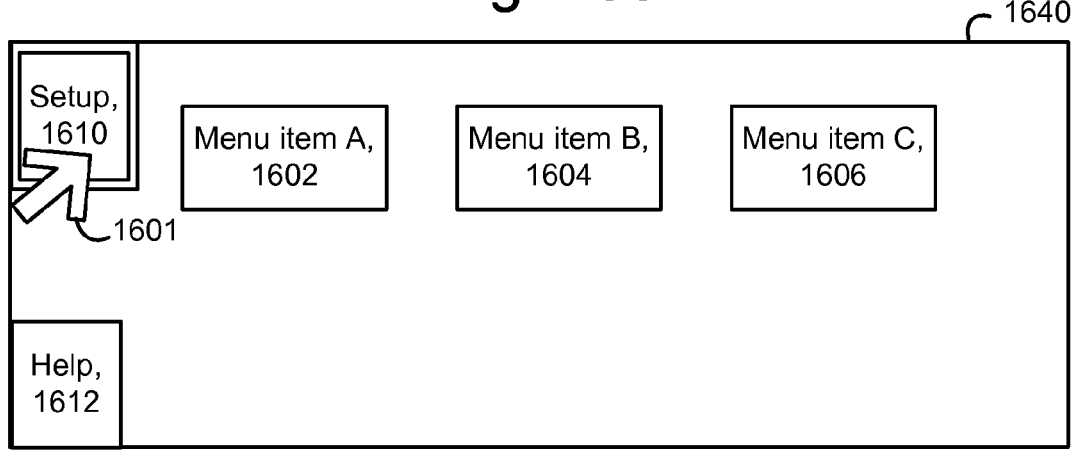
FIG. 16c depicts the example display of FIG. 16b after a user has caused the cursor to move over a desired menu item with a fine hand movement.

However, a simplified approach allows the user to make a coarse gesture of moving the hand a specified distance in the zone within a specified time, from right to left, causing the cursor to move to the left edge of the display, and remain there, as depicted in FIG. 16b. FIG. 16b provides a depiction 1620 of the example display of FIG. 16a after a user has caused the cursor to move to an edge region of the display with a coarse hand movement. Essentially, the user is allowed to overshoot the desired cursor position. The user can then make a more controlled or fine movement upwards to move the cursor over the intended setup item 1610 to select that item, as indicated by the depiction 1640 in FIG. 16c. FIG. 16c depicts the example display of FIG. 16b after a user has caused the cursor to move over a desired menu item with a fine hand movement.

Figure 17A:
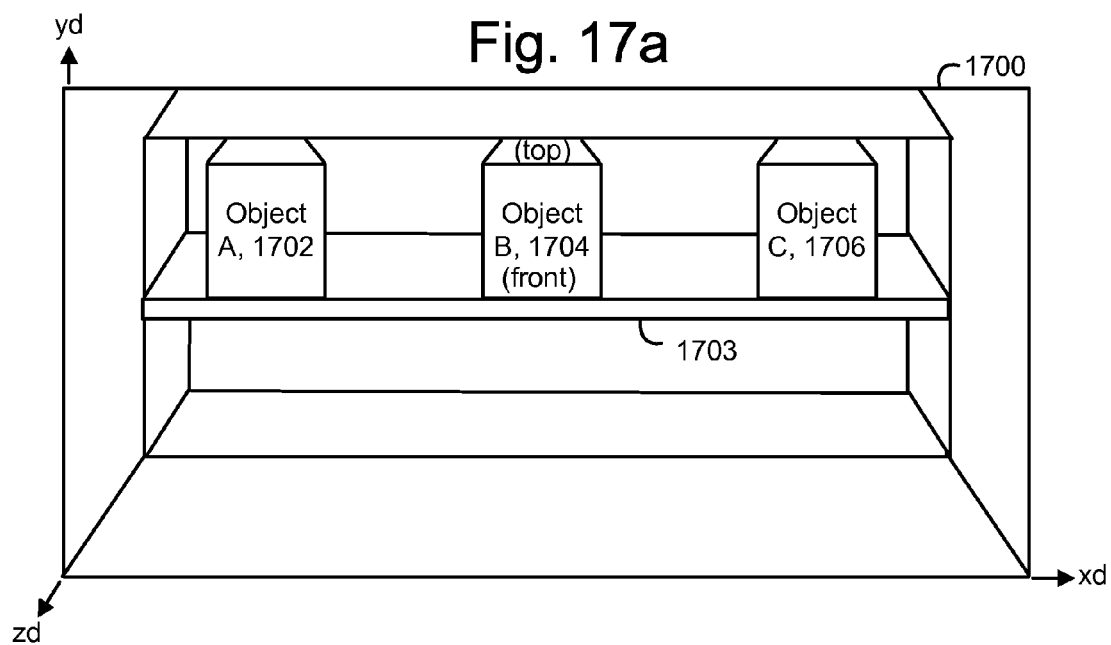
FIG. 17a depicts an example display of a 3-D virtual world which includes objects which can be handled by a user, as an example of processing an input at an application as set forth in step 508 of FIG. 5.
Figure 17B:
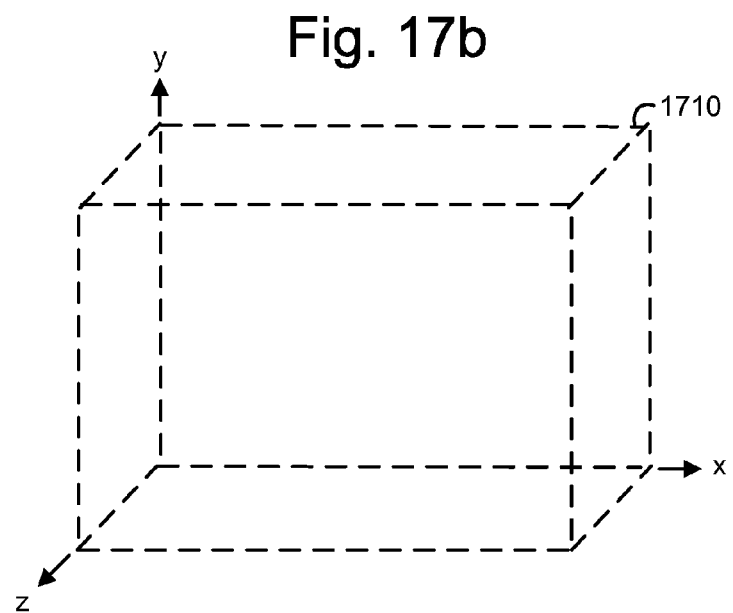

FIG. 17a depicts an example display of a 3-D virtual world which includes objects which can be handled by a user, as an example of processing an input at an application as set forth in step 508 of FIG. 5. The display 1700 includes a shelf 1703 in a virtual world which is described by an (xd, yd, zd) coordinate system. Three objects are placed on the shelf, namely object A 1702, object B 1704 and object C 1706. For example, the display might be used to allow a user to virtually shop for a game, where each object represents a box which contains the game, and each box includes sides or faces with writing or images which describe the game. For example, object B 1704 includes a front side, and a top side. The objects could be other sizes and shapes as well. Initially, the zone is not yet active, e.g., since the user has not placed his hands in the zone. FIG. 17b depicts an example physical interaction zone 1710 which is empty, and which corresponds to the display of FIG. 17a. The zone is described by an (x, y, z) coordinate system.

Figure 17C:
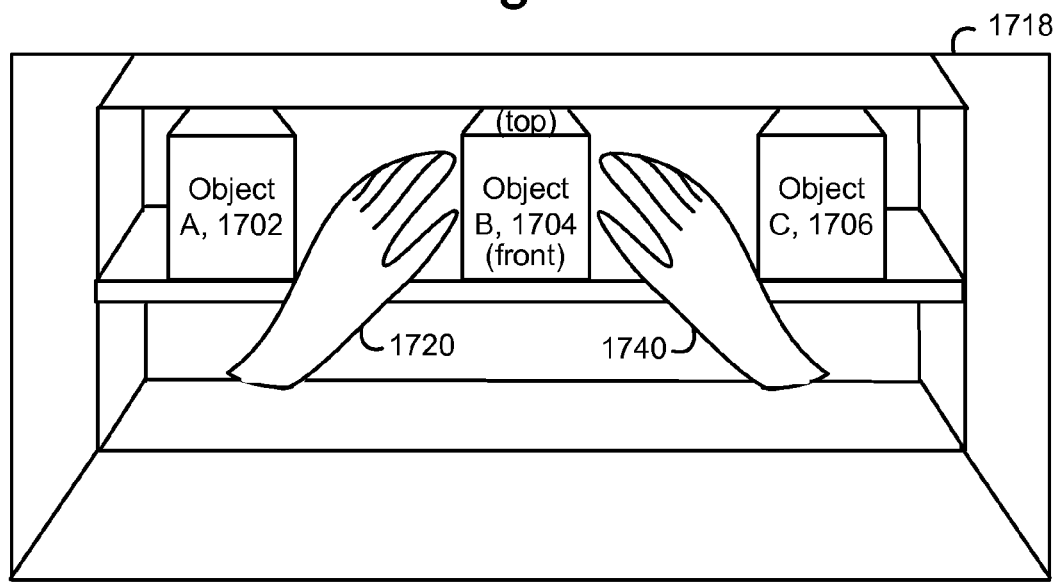
FIG. 17c depicts the display of FIG. 17a after avatar hands are displayed in a far position for reaching into the virtual world to grasp an object.
Figure 17D:
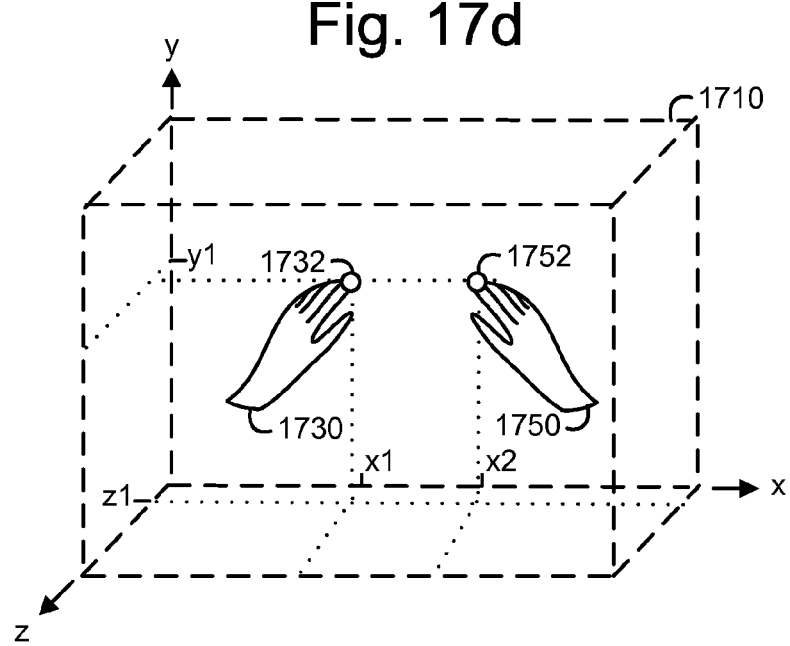

FIG. 17c depicts the display of FIG. 17a after avatar hands are displayed in a far position for reaching into the virtual world to grasp an object. In this depiction 1718 of the display, the user sees the objects in the display and reaches toward object B 1704, for instance, to examine it further. To do this, the user reaches his or her hands 1730 and 1750 into the zone 1710, as depicted in FIG. 17d. FIG. 17d depicts a user's hands in the example physical interaction zone of FIG. 17b, which causes the display of FIG. 17a. The left hand 1730 is at a position in the zone defined by a reference point 1732, which is described by coordinates (x1, y1, z1). The right hand 1750 is at a position in the zone defined by a reference point 1752, which is described by coordinates (x2, y1, z1). The left hand 1730 is mapped to an avatar of a left hand 1720 in the display at a corresponding location in the 3-D virtual world, while the right hand 1750 is mapped to an avatar of a right hand 1740 in the display at a corresponding location in the 3-D virtual world. Here, the user is reaching forward to the object A 1704, so that the hands are relatively far away from the user in the zone 1710, as indicated by the z1 depth coordinate. This is a natural movement which the user would make in the real world to reach forward and grasp an object.

When the avatar hands are near the object B 1704, the application may provide a visual feedback that the object has been grasped such as by slightly moving the object, or raising the object above the shelf, or providing a sound.

Figure 17E:
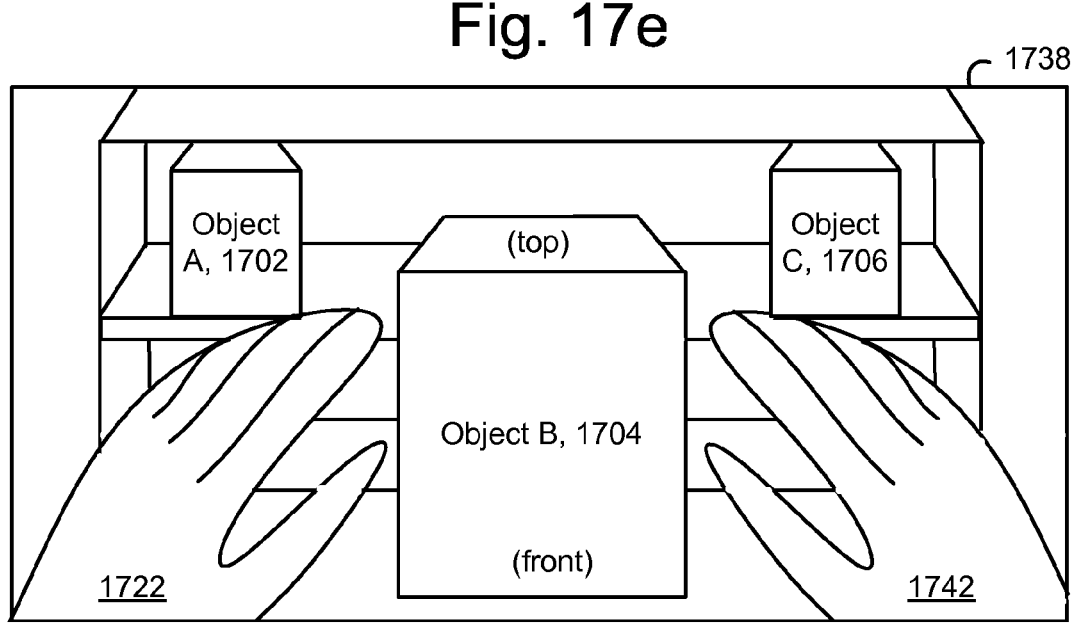
FIG. 17e depicts the display of FIG. 17c after the avatar hands are displayed in a close position for examining the object close up.

FIG. 17e depicts the display of FIG. 17c after the avatar hands are displayed in a close position for examining the object close up. In the depiction 1738 of the display, the user has grasped the object B 1704 and is moving it closer to examine it. The depictions of the avatar hands 1722 and 1742, and the object B 1704, indicate that they are closer to the user than in FIG. 17c.

Figure 17F:
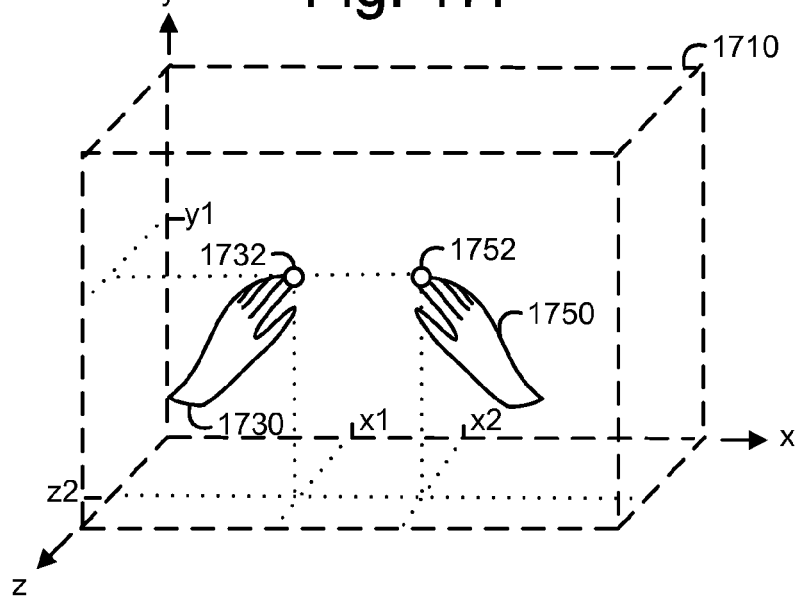
FIG. 17f depicts a user's hands in the example physical interaction zone of FIG. 17b, which causes the display of FIG. 17e.

FIG. 17f depicts a user's hands in the example physical interaction zone of FIG. 17b, which causes the display of FIG. 17e. As an example, both hands 1730 and 1750 are moved closer to the user, as indicated by the z coordinate z2>z1. For simplicity, the hands are assumed to be at the same x and y positions in the zone as in FIG. 17d. The left hand 1730 is at (x1, y1, z2) and the right hand 1750 is at (x2, y1, z2).

Figure 17G:
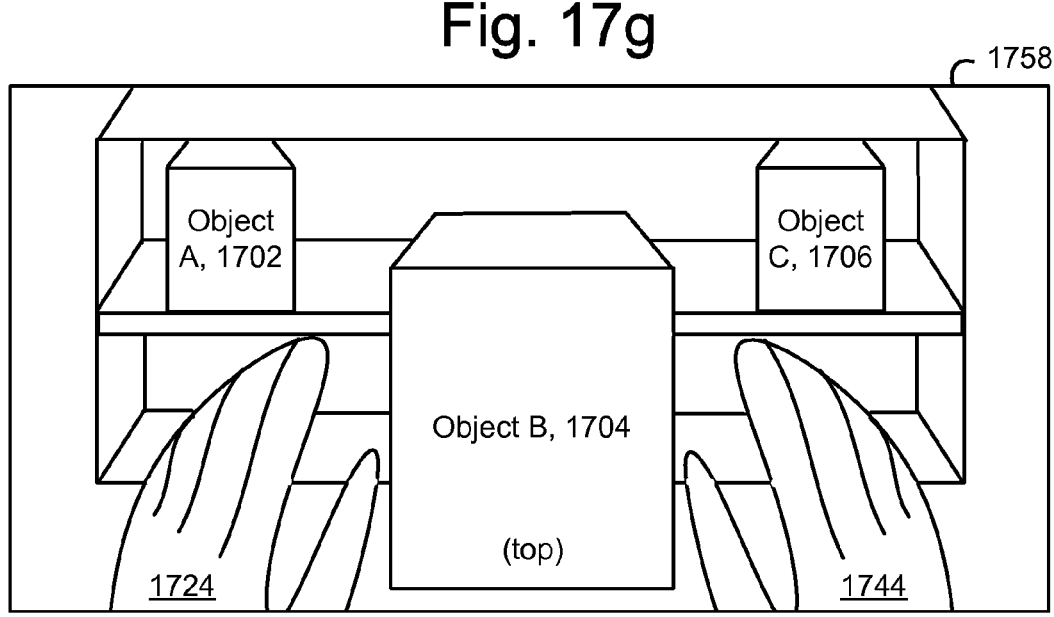
FIG. 17g depicts the display of FIG. 17e after the avatar hands are moved upwards for examining a top side of the object.

FIG. 17g depicts the display of FIG. 17e after the avatar hands are moved upwards for examining a top side of the object. In the depiction 1758 of the display, the user has grasped the object B 1704 and is rotating it so that the top side is facing forward. The depictions of the avatar hands 1724 and 1744 indicate an upward rotation, compared to FIG. 17e.

Figure 17H:
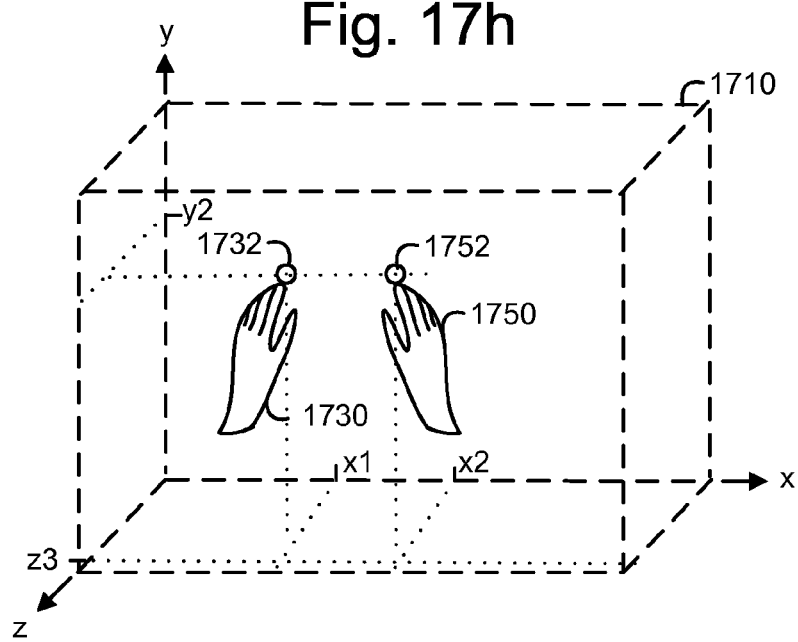
FIG. 17h depicts a user's hands in the example physical interaction zone of FIG. 17b, which causes the display of FIG. 17g.

FIG. 17h depicts a user's hands in the example physical interaction zone of FIG. 17b, which causes the display of FIG. 17g. As an example, both hands 1730 and 1750 are moved upwardly and rotated, as indicated by the y coordinate y2>y1. The hands 1730 and 1750 could also be moved closer to the user, as indicated by the z coordinate z3>z2. For simplicity, the hands are assumed to be at the same x positions in the zone as in FIG. 17f. The left hand 1730 is at (x1, y2, z3) and the right hand 1750 is at (x2, y2, z3).

Figure 17I:
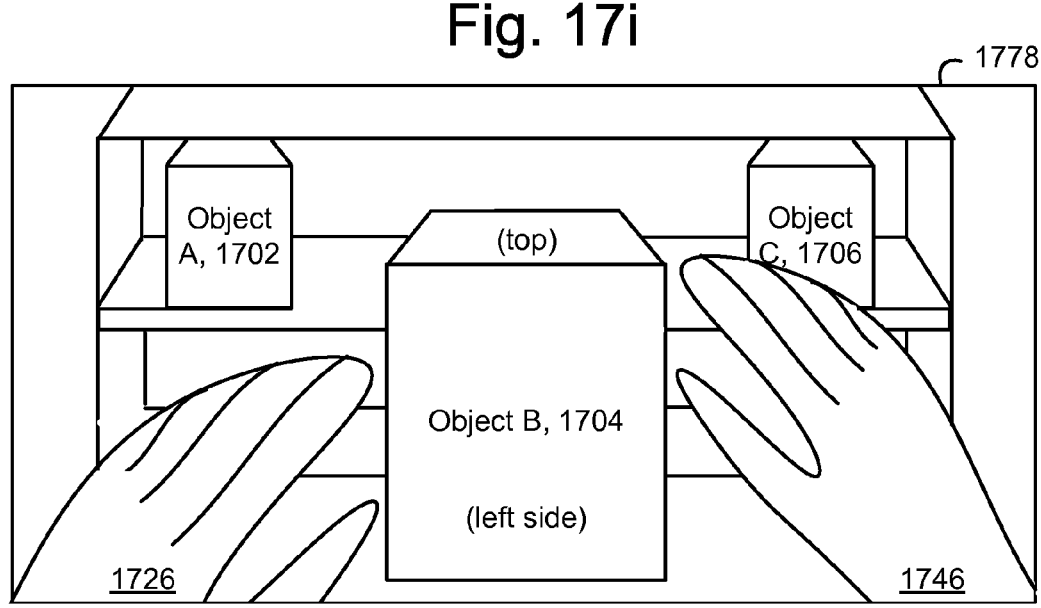
FIG. 17i depicts the display of FIG. 17e after the left avatar hand is moved back and the right avatar hand is moved forward, for examining a left side surface of the object.

FIG. 17i depicts the display of FIG. 17e after the left avatar hand is moved back and the right avatar hand is moved forward, in a twisting or rotating motion, for examining a left side surface of the object. In the depiction 1778 of the display, the user has grasped the object B 1704 and is rotating it so that the left side is facing forward. The depictions of the avatar hands 1726 and 1746 indicate a rightward rotation, compared to FIG. 17e.

Figure 17J:
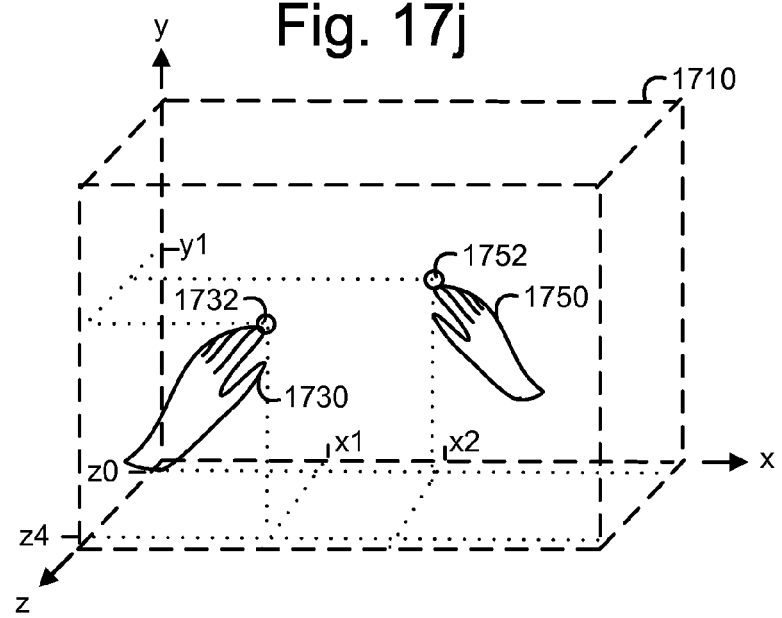
FIG. 17j depicts a user's hands in the example physical interaction zone of FIG. 17b, which causes the display of FIG. 17i.

FIG. 17j depicts a user's hands in the example physical interaction zone of FIG. 17b, which causes the display of FIG. 17i. As an example, the left hand 1730 is moved rearward in the zone (from z2 to z4), and the right hand 1750 is moved forward (from z2 to z0). For simplicity, the hands are assumed to be at the same x and y positions in the zone as in FIG. 17f. The left hand 1730 is at (x1, y1, z4) and the right hand 1750 is at (x2, y1, z0).

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen to best explain the principles of the technology and its practical application to thereby enable others skilled in the art to best utilize the technology in various embodiments and with various modifications as are suited to the particular use contemplated. It is intended that the scope of the technology be defined by the claims appended hereto.

We claim:

1. A processor-implemented method for tracking user movement in a motion capture system, comprising the processor-implemented steps of:

tracking a body of a user in a field of view of the motion capture system, the tracking comprises determining a model of the body;

determining reference points of the model, the reference points identify shoulders of the body and include a reference point which represents one of the shoulders;

determining a size of the body based on the reference points;

determining a natural biomechanical range of movement of a hand of the body based on the reference points;

determining a size and position of a zone encompassing the natural biomechanical range of movement of the hand based on the reference points, the zone is a 3-D volume in the field of view and has a coordinate system which is defined relative to one of the reference points, the size of the zone is based on the size of the body, and the determining the size and position of the zone comprises determining a distance from the reference point which represents the one of the shoulders to a rear surface of the zone, wherein a gap exists between the reference point which represents the one of the shoulders and the rear surface of the zone, and determining a distance between the rear surface of the zone and a front surface of the zone;

tracking movement of the hand in the zone relative to the coordinate system of the zone; and based on the tracking of the movement of the hand, translating the movement of the hand in the zone to a corresponding movement of a cursor on a display.

2. The processor-implemented method of claim 1, wherein the zone is offset from a center of the body, and is curved according to the natural biomechanical range of movement of the hand.

3. The processor-implemented method of claim 1, wherein the tracking the movement of the hand comprises determining that the hand has crossed between subsets zones of the zone, the method further comprising:

providing an input to an application which provides the display indicating that the hand has crossed between subsets zones, in response to the determining that the hand has crossed between the subsets zones.

4. The processor-implemented method of claim 1, wherein:

determining a size and position of another zone based on the reference points, the another zone is a 3-D volume in the field of view and has a coordinate system which is defined relative to one of the reference points;

tracking movement of another hand of the body in the another zone relative to the coordinate system of the another zone; and based on the tracking movement of the another hand, translating the movement of the another hand in the another zone to a corresponding action on the display.

5. The processor-implemented method of claim 1, wherein:

the zone in which the movement of the hand is tracked comprises a central subzone which is smaller than a reach envelop of the body, and a lateral subzone which is lateral of the central subzone; and the tracking the movement of the hand comprises determining that the hand moves from a position in the central subzone, past a boundary between the central subzone and the lateral subzone, to a position in the lateral subzone —within a specified time period, in response to which the cursor moves from a non-edge position on the display to an edge position on the display.

6. The processor-implemented method of claim 1, wherein the zone comprises first and second subsets, and the method further comprises:
  detecting that the hand is in the first or second subset, wherein the corresponding action on the display is responsive to the detecting that the hand is in the first or second subset.

7. The processor-implemented method of claim 1, wherein:
  the zone is anchored to the body as the body walks in the field of view.

8. The processor-implemented method of claim 1, wherein:
  the position of the zone is defined relative to whichever shoulder is closest to a depth camera of the motion capture system, so that the zone remains between the body and the depth camera.

9. The processor-implemented method of claim 1, wherein:
  the determining the size and position of the zone comprises setting a width of the zone based on a distance from the reference point which represents the one of the shoulders to a side surface of the zone and a distance from the reference point which represents the one of the shoulders to another side surface of the zone, and setting a height of the zone based on a distance from the reference point which represents the one of the shoulders to a top surface of the zone and a distance from the reference point which represents the one of the shoulders to a bottom surface of the zone.

10. A motion capture system, comprising:
  a depth camera system having a field of view;
  a display; and
  one or more processors in communication with the depth camera system and the display, the processor executes instructions to track user movement and to provide a signal to the display to display images;
  wherein the depth camera system and the one or more processors:
    to track a body of a user in the field of view, determine a model of the body;
    determine reference points of the model, the reference points comprise a reference point which identifies a shoulder of the body, a reference point which identifies an elbow of the body, a reference point which identifies a hand of the body;
    determine a length of an arm of the body based on a sum of a distance between the reference point which identifies the shoulder of the body and the reference point which identifies the elbow of the body and a distance between the reference point which identifies the elbow of the body and the reference point which identifies the hand;
    determine a position of a zone encompassing a comfortable reach of the hand based on the reference point which identifies the shoulder of the body, the zone is a 3-D volume in the field of view and has a coordinate system which is defined relative to one of the reference points and is anchored to the model of the body;
    determine a width of the zone based on a specified percentage of the length of the arm;
    track movement of the hand in the zone relative to the coordinate system of the zone;
    determine a portion of the zone which the hand moves across in the movement;
    translate the movement of the hand in the zone from the coordinate system of the zone to a coordinate system of the display; and
    update the display based on the translated movement of the hand.

11. The motion capture system of claim 10, wherein:
  the display is rectangular;
  the zone is curved according to a natural biomechanical range of movement of the hand; and
  the display is updated based on a mapping between points in the display and corresponding points in the zone, the mapping maps a curved motion of the hand in the zone to a horizontal motion of a cursor on the display.

12. Tangible computer readable storage device having computer readable software embodied thereon for programming a processor to perform a method in a motion capture system, the method comprising:
  tracking a body in a field of view of the motion capture system, the tracking comprises determining a model of the body;
  determining reference points of the model;
  determining a size and position of a first zone based on the reference points, the first zone is a 3-D volume in the field of view and has a coordinate system which is defined relative to one of the reference points, and the size of the first zone is based on a range of movement of a hand of the body when the hand pivots from an elbow;
  determining a size and position of a second zone based on the reference points, the second zone is a 3-D volume in the field of view and has a coordinate system which is defined relative to one of the reference points, the second zone is smaller than the first zone and overlaps, at least in part, with the first zone, and the size of the second zone is based on a range of movement of the hand when the hand pivots from a wrist;
  tracking movement of the hand in the first zone relative to the coordinate system of the first zone and translatin~ the movement of the hand in the first zone to a corresponding movement of a cursor on a display based on a mapping between the first zone and the display;
  based on the tracking of the movement of the hand in the first zone, storing a record of a position of the hand for a period of time;
  based on the record, determining that hand of the body is confined to the second zone over the period of time; and
  based on the determining that hand of the body is confined to the second zone over the period of time, switching from tracking movement of the hand in the first zone relative to the coordinate system of the first zone and the translating the movement of the hand in the first zone to the corresponding movement of the cursor on the display based on the mapping between the first zone and the display, to tracking movement of the hand in the second zone relative to the coordinate system of the second zone and translating the movement of the hand in the second zone to a corresponding movement of the cursor on the display based on a mapping between the second zone and the display.

13. The tangible computer readable storage device of claim 12, wherein:
  the tracking movement of the hand in the second zone relative to the coordinate system of the second zone and translating the movement of the hand in the second zone based on the mapping between the second zone and the display, allows the body to more easily move the cursor on the display compared to the tracking the movement of the hand in the first zone relative to the coordinate system of the first zone and the translating the movement of the hand in the first zone based on the mapping between the first zone and the display.

14. The processor-implemented method of claim 1, wherein:
the translating of the movement of the hand in the zone to the corresponding movement of the cursor on the display is based on a nonlinear mapping between points in the zone and corresponding points in the display, where an upper left point, an upper right point, a lower left point and a lower right point of the zone are mapped to an upper left point, an upper right point, a lower left point and a lower right point, respectively, of the display.

15. The processor-implemented method of claim 1, wherein:
the determining the natural biomechanical range of movement of the hand based on the reference points comprises determining a natural biomechanical range of movement of an arm of the body based on the reference points.

16. The processor-implemented method of claim 1, wherein:
the reference points identify another point which represents another of the shoulders;
a length of a shoulder line of the body is determined as a distance between the point which represents one of the shoulders and the point which represents the another of the shoulders; and
the size of the zone is a function of the length of the shoulder line.

17. The processor-implemented method of claim 1, wherein:
the reference points include a point which represents an elbow and a point which represents a hand of the body;
an arm length is determined based on a sum of a distance between the point which represents the one of the shoulders and the point which represents the elbow and a distance between the point which represents the elbow and the point which represents the hand; and
a width of the zone is a function of the arm length.

18. The processor-implemented method of claim 1, wherein:
the reference points identify a torso of the body; and
a height of the zone is a function of a height of the torso.

19. The motion capture system of claim 10, wherein:
the reference points comprise a reference point which identifies a chin of the body and a reference point which identifies a waist of the body; and
the one or more processors:
determine a distance between the reference point which identifies the chin of the body and the reference point which identifies the waist of the body; and
determine a height of the zone based on the distance between the reference point which identifies the chin of the body and the reference point which identifies the waist of the body.

20. The tangible computer readable storage device of claim 12, wherein:
the translating of the movement of the hand in the first zone relative to the coordinate system of the first zone to the corresponding movement of the cursor on the display is based on a nonlinear mapping between points in the first zone and corresponding points in the display.

* * * * *